(12) United States Patent
Gass

(10) Patent No.: US 8,061,245 B2
(45) Date of Patent: Nov. 22, 2011

(54) SAFETY METHODS FOR USE IN POWER EQUIPMENT

(75) Inventor: Stephen F. Gass, Wilsonville, OR (US)

(73) Assignee: SD3, LLC, Tualatin, OR (US)

( * ) Notice: Subject to any disclaimer, the term of this patent is extended or adjusted under 35 U.S.C. 154(b) by 2068 days.

(21) Appl. No.: 10/984,643

(22) Filed: Nov. 8, 2004

(65) Prior Publication Data

US 2005/0066784 A1    Mar. 31, 2005

Related U.S. Application Data

(63) Continuation of application No. 09/676,190, filed on Sep. 29, 2000, now Pat. No. 7,055,417, and a continuation of application No. 09/929,221, filed on Aug. 13, 2001, and a continuation of application No. 09/929,226, filed on Aug. 13, 2001, now Pat. No. 6,920,814, and a continuation of application No. 09/929,227, filed on Aug. 13, 2001, and a continuation of application No. 09/929,234, filed on Aug. 13, 2001, and a continuation of application No. 09/929,235, filed on Aug. 13, 2001, and a continuation of application No. 09/929,236, filed on Aug. 13, 2001, now abandoned, and a continuation of application No. 09/929,237, filed on Aug. 13, 2001, and a continuation of application No. 09/929,238, filed on Aug. 13, 2001, and a continuation of application No. 09/929,240, filed on Aug. 13, 2001, now Pat. No. 7,100,483, and a continuation of application No. 09/929,241, filed on Aug. 13, 2001, now Pat. No. 7,024,975, and a continuation of application No. 09/929,242, filed on Aug. 13, 2001, and a continuation of application No. 09/929,244, filed on Aug. 13, 2001, now Pat. No.

(Continued)

(51) Int. Cl.
*B26D 5/00* (2006.01)
*B26D 1/14* (2006.01)

(52) U.S. Cl. ......... 83/58; 83/62.1; 83/DIG. 1; 83/477.2; 83/477.1; 83/788

(58) Field of Classification Search .................. 83/62.1, 83/58, 47, 1.2, 477.2, 490, 581, 72, DIG. 1, 83/62, 487, 488, 397, 477.1, 485, 471.3, 83/78.8, 76.7, 491, 526, 357.1, 544; 144/154.5, 144/356, 384, 391, 427, 286.5; 408/5, 10.4, 408/11.3; 56/10.4, 11.3; 74/2
See application file for complete search history.

(56) References Cited

U.S. PATENT DOCUMENTS 146,886 A    1/1874    Doane et al.
(Continued)

FOREIGN PATENT DOCUMENTS

CA    2140991    1/1995
(Continued)

OTHER PUBLICATIONS

Gordon Engineering Corp., Product Catalog, Oct. 1997, pgs. cover, 1, 3 and back, Brookfield, Connecticut, US.

(Continued)

*Primary Examiner* — Ghassem Alie

(57) ABSTRACT

Woodworking machines and safety methods for use with those machines are disclosed. The machines include a detection system adapted to detect one or more dangerous conditions between a person and the cutting tools, and a reaction system associated with the detection system. The reaction system is configured to retract the cutting tool at least partially away from the cutting region upon detection of a dangerous condition by the detection system.

1 Claim, 9 Drawing Sheets

Related U.S. Application Data 6,857,345, and a continuation of application No. 09/929,425, filed on Aug. 13, 2001, now Pat. No. 7,137,326, and a continuation of application No. 09/929,426, filed on Aug. 13, 2001, and a continuation of application No. 09/955,418, filed on Sep. 17, 2001, now Pat. No. 6,957,601, and a continuation of application No. 10/047,066, filed on Jan. 14, 2002, now Pat. No. 6,945,148, and a continuation of application No. 10/051,782, filed on Jan. 15, 2002, now Pat. No. 6,877,410, and a continuation of application No. 10/052,273, filed on Jan. 16, 2002, now Pat. No. 6,813,983, and a continuation of application No. 10/052,274, filed on Jan. 16, 2002, now Pat. No. 6,826,988, and a continuation of application No. 10/052,705, filed on Jan. 16, 2002, now Pat. No. 6,994,004, and a continuation of application No. 10/052,806, filed on Jan. 16, 2002, now Pat. No. 6,880,440, and a continuation of application No. 10/053,390, filed on Jan. 16, 2002, and a continuation of application No. 10/100,211, filed on Mar. 13, 2002, and a continuation of application No. 10/146,527, filed on May 15, 2002, and a continuation of application No. 10/172,553, filed on Jun. 13, 2002, and a continuation of application No. 10/189,031, filed on Jul. 2, 2002, and a continuation of application No. 10/189,027, filed on Jul. 2, 2002, and a continuation of application No. 10/197,975, filed on Jul. 18, 2002, now abandoned, and a continuation of application No. 10/202,928, filed on Jul. 25, 2002, now Pat. No. 7,000,514, and a continuation of application No. 10/205,164, filed on Jul. 25, 2002, now Pat. No. 6,945,149, and a continuation of application No. 10/243,042, filed on Sep. 13, 2002, and a continuation of application No. 10/251,576, filed on Sep. 20, 2002, now abandoned, and a continuation of application No. 10/292,607, filed on Nov. 12, 2002, now Pat. No. 7,077,039, and a continuation of application No. 10/345,630, filed on Jan. 15, 2003, and a continuation of application No. 10/341,260, filed on Jan. 13, 2003, and a continuation of application No. 10/643,296, filed on Aug. 18, 2003, now abandoned, and a continuation of application No. 10/785,361, filed on Feb. 23, 2004, now Pat. No. 6,997,090, which is a continuation of application No. 10/215,929, filed on Aug. 9, 2002, now abandoned, application No. 10/984,643, which is a continuation of application No. 10/932,339, filed on Sep. 1, 2004, which is a continuation of application No. 10/047,066, filed on Jan. 14, 2002, now Pat. No. 6,945,148, and a continuation of application No. 10/050,085, filed on Jan. 14, 2002, now abandoned.

(56) References Cited

U.S. PATENT DOCUMENTS

| | | | |
|---|---|---|---|
| 162,814 | A | 5/1875 | Graves et al. |
| 261,090 | A | 7/1882 | Grill |
| 264,412 | A | 9/1882 | Kuhlmann |
| 299,480 | A | 5/1884 | Kuhlman et al. |
| 302,041 | A | 7/1884 | Sill |
| 307,112 | A | 10/1884 | Groff |
| 509,253 | A | 11/1893 | Shields |
| 545,504 | A | 9/1895 | Hoover |
| 869,513 | A | 10/1907 | Pfeil |
| 941,726 | A | 11/1909 | Pfalzgraf |
| 982,312 | A | 1/1911 | Swafford |
| 997,720 | A | 7/1911 | Troupenat |
| 1,037,843 | A | 9/1912 | Ackley |
| 1,050,649 | A | 1/1913 | Harrold et al. |
| 1,054,558 | A | 2/1913 | Jones |
| 1,074,198 | A | 9/1913 | Phillips |
| 1,082,870 | A | 12/1913 | Humason |
| 1,101,515 | A | 6/1914 | Adam |
| 1,126,970 | A | 2/1915 | Folmer |
| 1,132,129 | A | 3/1915 | Stevens |
| 1,148,169 | A | 7/1915 | Howe |
| 1,154,209 | A | 9/1915 | Rushton |
| 1,205,246 | A | 11/1916 | Mowry |
| 1,228,047 | A | 5/1917 | Reinhold |
| 1,240,430 | A | 9/1917 | Erickson |
| 1,244,187 | A | 10/1917 | Frisbie |
| 1,255,886 | A | 2/1918 | Jones |
| 1,258,961 | A | 3/1918 | Tattersall |
| 1,311,508 | A | 7/1919 | Harrold |
| 1,324,136 | A | 12/1919 | Turner |
| 1,381,612 | A | 6/1921 | Anderson |
| 1,397,606 | A | 11/1921 | Smith |
| 15,262 | | 1/1922 | Gurgel |
| 1,427,005 | A | 8/1922 | McMichael |
| 1,430,983 | A | 10/1922 | Granberg |
| 1,450,906 | A | 4/1923 | Anderson |
| 1,464,924 | A | 8/1923 | Drummond |
| 1,465,224 | A | 8/1923 | Lantz |
| 1,492,145 | A | 4/1924 | Talley |
| 1,496,212 | A | 6/1924 | French |
| 1,511,797 | A | 10/1924 | Berghold |
| 1,526,128 | A | 2/1925 | Flohr |
| 1,527,587 | A | 2/1925 | Hutchinson |
| 1,551,900 | A | 9/1925 | Morrow |
| 1,553,996 | A | 9/1925 | Federer |
| 1,582,483 | A | 4/1926 | Runyan |
| 1,590,988 | A | 6/1926 | Campbell |
| 1,600,604 | A | 9/1926 | Sorlien |
| 1,616,478 | A | 2/1927 | Watson |
| 1,640,517 | A | 8/1927 | Procknow |
| 1,662,372 | A | 3/1928 | Ward |
| 1,668,061 | A | 5/1928 | Falkins |
| 1,701,948 | A | 2/1929 | Crowe |
| 1,711,490 | A | 5/1929 | Drummond |
| 1,712,828 | A | 5/1929 | Klehm |
| 1,774,521 | A | 9/1930 | Neighbour |
| 1,807,120 | A | 5/1931 | Lewis |
| 1,811,066 | A | 6/1931 | Tannewitz |
| 1,879,280 | A | 9/1932 | James |
| 1,896,924 | A | 2/1933 | Ulrich |
| 1,902,270 | A | 3/1933 | Tate |
| 1,904,005 | A | 4/1933 | Masset |
| 1,910,651 | A | 5/1933 | Tautz |
| 1,938,548 | A | 12/1933 | Tautz |
| 1,938,549 | A | 12/1933 | Tautz |
| 1,963,688 | A | 6/1934 | Tautz |
| 1,988,102 | A | 1/1935 | Woodward |
| 1,993,219 | A | 3/1935 | Merrigan |
| 2,007,887 | A | 7/1935 | Tautz |
| 2,010,851 | A | 8/1935 | Drummond |
| 2,020,222 | A | 11/1935 | Tautz |
| 2,038,810 | A | 4/1936 | Tautz |
| 2,044,481 | A | 6/1936 | Manley et al. |
| 2,075,282 | A | 3/1937 | Hedgpeth |
| 2,095,330 | A | 10/1937 | Hedgpeth |
| 2,106,288 | A | 1/1938 | Tautz |
| 2,106,321 | A | 1/1938 | Guertin |
| 2,121,069 | A | 6/1938 | Collins |
| 2,131,492 | A | 9/1938 | Ocenasek |
| 2,163,320 | A | 6/1939 | Hammond |
| 2,168,282 | A | 8/1939 | Tautz |
| 2,241,556 | A | 5/1941 | MacMillin et al. |
| 2,261,696 | A | 11/1941 | Ocenasek |
| 2,265,407 | A | 12/1941 | Tautz |
| 2,286,589 | A | 6/1942 | Tannewitz |
| 2,292,872 | A | 8/1942 | Eastman |
| 2,299,262 | A | 10/1942 | Uremovich |
| 2,312,118 | A | 2/1943 | Neisewander |
| 2,313,686 | A | 3/1943 | Uremovich |
| 2,328,244 | A | 8/1943 | Woodward |
| 2,352,235 | A | 6/1944 | Tautz |

| | | | | | | |
|---|---|---|---|---|---|---|
| 2,377,265 A | 3/1945 | Rady | | 3,306,149 A | 2/1967 | John |
| 2,392,486 A | 1/1946 | Larsen | | 3,313,185 A | 4/1967 | Drake et al. |
| 2,402,232 A | 6/1946 | Baker | | 3,315,715 A | 4/1967 | Mytinger |
| 2,425,331 A | 8/1947 | Kramer | | 3,323,814 A | 6/1967 | Phillips |
| 2,434,174 A | 1/1948 | Morgan | | 3,337,008 A | 8/1967 | Trachte |
| 2,452,589 A | 11/1948 | McWhirter et al. | | 3,356,111 A | 12/1967 | Mitchell |
| 2,466,325 A | 4/1949 | Ocenasek | | 3,368,596 A | 2/1968 | Corner |
| 2,496,613 A | 2/1950 | Wooward | | 3,386,322 A | 6/1968 | Stone et al. |
| 2,501,134 A | 3/1950 | Meckoski et al. | | 3,439,183 A | 4/1969 | Hurst, Jr |
| 2,509,813 A | 5/1950 | Dineen | | 3,445,835 A | 5/1969 | Fudaley |
| 2,517,649 A | 8/1950 | Frechtmann | | 3,454,286 A | 7/1969 | Anderson et al. |
| 2,518,684 A | 8/1950 | Harris | | 3,456,696 A | 7/1969 | Gregory et al. |
| 2,530,290 A | 11/1950 | Collins | | 3,512,440 A | 5/1970 | Frydmann |
| 2,554,124 A | 5/1951 | Salmont | | 3,538,964 A | 11/1970 | Warrick et al. |
| 2,562,396 A | 7/1951 | Schutz | | 3,540,338 A | 11/1970 | McEwan et al. |
| 2,572,326 A | 10/1951 | Evans | | 3,554,067 A | 1/1971 | Scutella |
| 2,590,035 A | 3/1952 | Pollak | | 3,566,996 A | 3/1971 | Crossman |
| 2,593,596 A | 4/1952 | Olson | | 3,580,376 A | 5/1971 | Loshbough |
| 2,601,878 A | 7/1952 | Anderson | | 3,581,784 A | 6/1971 | Warrick |
| 2,623,555 A | 12/1952 | Eschenburg | | 3,593,266 A | 7/1971 | Van Sickle |
| 2,625,966 A | 1/1953 | Copp | | 3,613,748 A | 10/1971 | De Pue |
| 2,626,639 A | 1/1953 | Hess | | 3,621,894 A | 11/1971 | Niksich |
| 2,661,777 A | 12/1953 | Hitchcock | | 3,648,126 A | 3/1972 | Boos et al. |
| 2,661,780 A | 12/1953 | Morgan | | 3,670,788 A | 6/1972 | Pollak et al. |
| 2,675,707 A | 4/1954 | Brown | | 3,675,444 A | 7/1972 | Whipple |
| 2,678,071 A | 5/1954 | Odlum et al. | | 3,680,609 A | 8/1972 | Menge |
| 2,690,084 A | 9/1954 | Van Dam | | 3,688,815 A | 9/1972 | Ridenour |
| 2,695,638 A | 11/1954 | Gaskell | | 3,695,116 A | 10/1972 | Baur |
| 2,704,560 A | 3/1955 | Woessner | | 3,696,844 A | 10/1972 | Bernatschek |
| 2,711,762 A | 6/1955 | Gaskell | | 3,716,113 A | 2/1973 | Kobayashi et al. |
| 2,719,547 A | 10/1955 | Gjerde | | 3,719,103 A | 3/1973 | Streander |
| 2,722,246 A | 11/1955 | Arnoldy | | 3,740,000 A | 6/1973 | Takada |
| 2,731,049 A | 1/1956 | Akin | | 3,745,546 A | 7/1973 | Struger et al. |
| 2,736,348 A | 2/1956 | Nelson | | 3,749,933 A | 7/1973 | Davidson |
| 2,737,213 A | 3/1956 | Richards et al. | | 3,754,493 A | 8/1973 | Niehaus et al. |
| 2,758,615 A | 8/1956 | Mastriforte | | 3,772,590 A | 11/1973 | Mikulecky et al. |
| 2,785,710 A | 3/1957 | Mowery, Jr | | 3,785,230 A | 1/1974 | Lokey |
| 2,786,496 A | 3/1957 | Eschenburg | | 3,793,915 A | 2/1974 | Huier |
| 2,804,890 A | 9/1957 | Fink | | 3,805,639 A | 4/1974 | Peter |
| 2,810,408 A | 10/1957 | Boice et al. | | 3,805,658 A | 4/1974 | Scott et al. |
| 2,839,943 A | 6/1958 | Caldwell et al. | | 3,808,932 A | 5/1974 | Russell |
| 2,844,173 A | 7/1958 | Gaskell | | 3,829,850 A | 8/1974 | Guetersloh |
| 2,850,054 A | 9/1958 | Eschenburg | | 3,829,970 A | 8/1974 | Anderson |
| 2,852,047 A | 9/1958 | Odlum et al. | | 3,858,095 A | 12/1974 | Friemann et al. |
| 2,873,773 A | 2/1959 | Gaskell | | 3,861,016 A | 1/1975 | Johnson et al. |
| 2,876,809 A | 3/1959 | Rentsch et al. | | 3,863,208 A | 1/1975 | Balban |
| 2,883,486 A | 4/1959 | Mason | | 3,874,747 A | 4/1975 | Case et al. |
| 2,894,546 A | 7/1959 | Eschenburg | | 3,880,032 A | 4/1975 | Green |
| 2,913,025 A | 11/1959 | Richards | | 3,882,744 A | 5/1975 | McCarroll |
| 2,913,581 A | 11/1959 | Simonton et al. | | 3,886,413 A | 5/1975 | Dow et al. |
| 2,937,672 A | 5/1960 | Gjerde | | 3,889,567 A | 6/1975 | Sato et al. |
| 2,945,516 A | 7/1960 | Edgemond, Jr. et al. | | 3,905,263 A | 9/1975 | Smith |
| 2,954,118 A | 9/1960 | Anderson | | 3,922,785 A | 12/1975 | Fushiya |
| 2,957,166 A | 10/1960 | Gluck | | 3,924,688 A | 12/1975 | Cooper et al. |
| 2,978,084 A | 4/1961 | Vilkaitis | | 3,931,727 A | 1/1976 | Luenser |
| 2,984,268 A | 5/1961 | Vuichard | | 3,935,777 A | 2/1976 | Bassett |
| 2,991,593 A | 7/1961 | Cohen | | 3,945,286 A | 3/1976 | Smith |
| 3,005,477 A | 10/1961 | Sherwen | | 3,946,631 A | 3/1976 | Malm |
| 3,007,501 A | 11/1961 | Mundell et al. | | 3,947,734 A | 3/1976 | Fyler |
| 3,011,529 A | 12/1961 | Copp | | 3,949,636 A | 4/1976 | Ball et al. |
| 3,011,610 A | 12/1961 | Stiebel et al. | | 3,953,770 A | 4/1976 | Hayashi |
| 3,013,592 A | 12/1961 | Ambrosio et al. | | 3,960,310 A | 6/1976 | Nussbaum |
| 3,021,881 A | 2/1962 | Edgemond, Jr. et al. | | 3,967,161 A | 6/1976 | Lichtblau |
| 3,035,995 A | 5/1962 | Seeley et al. | | 3,974,565 A | 8/1976 | Ellis |
| 3,047,116 A | 7/1962 | Stiebel et al. | | 3,975,600 A | 8/1976 | Marston |
| 3,085,602 A | 4/1963 | Gaskell | | 3,978,624 A | 9/1976 | Merkel et al. |
| 3,105,530 A | 10/1963 | Peterson | | 3,994,192 A | 11/1976 | Faig |
| 3,129,731 A | 4/1964 | Tyrrell | | 4,007,679 A | 2/1977 | Edwards |
| 3,163,732 A | 12/1964 | Abbott | | 4,016,490 A | 4/1977 | Weckenmann et al. |
| 3,184,001 A | 5/1965 | Reinsch et al. | | 4,026,174 A | 5/1977 | Fierro |
| 3,186,256 A | 6/1965 | Reznick | | 4,026,177 A | 5/1977 | Lokey |
| 3,207,273 A | 9/1965 | Jurin | | 4,029,159 A | 6/1977 | Nymann |
| 3,213,731 A | 10/1965 | Renard | | 4,047,156 A | 9/1977 | Atkins |
| 3,224,474 A | 12/1965 | Bloom | | 4,048,886 A | 9/1977 | Zettler |
| 3,232,326 A | 2/1966 | Speer et al. | | 4,060,160 A | 11/1977 | Lieber |
| 3,246,205 A | 4/1966 | Miller | | 4,070,940 A | 1/1978 | McDaniel et al. |
| 3,249,134 A | 5/1966 | Vogl et al. | | 4,075,961 A | 2/1978 | Harris |
| 3,274,876 A | 9/1966 | Debus | | 4,077,161 A | 3/1978 | Wyle et al. |
| 3,276,497 A | 10/1966 | Heer | | 4,085,303 A | 4/1978 | McIntyre et al. |

| | | | | | |
|---|---|---|---|---|---|
| 4,090,345 A | 5/1978 | Harkness | 4,840,135 A | 6/1989 | Yamauchi |
| 4,091,698 A | 5/1978 | Obear et al. | 4,845,476 A | 7/1989 | Rangeard et al. |
| 4,106,378 A | 8/1978 | Kaiser | 4,864,455 A | 9/1989 | Shimomura et al. |
| 4,117,752 A | 10/1978 | Yoneda | 4,875,398 A | 10/1989 | Taylor et al. |
| 4,145,940 A | 3/1979 | Woloveke et al. | 4,888,869 A | 12/1989 | Leatherman |
| 4,152,833 A | 5/1979 | Phillips | 4,896,607 A | 1/1990 | Hall et al. |
| 4,161,649 A | 7/1979 | Klos et al. | 4,906,962 A | 3/1990 | Duimstra |
| 4,175,452 A | 11/1979 | Idel | 4,907,679 A | 3/1990 | Menke |
| 4,184,394 A | 1/1980 | Gjerde | 4,934,233 A | 6/1990 | Brundage et al. |
| 4,190,000 A | 2/1980 | Shaull et al. | 4,936,876 A | 6/1990 | Reyes |
| 4,195,722 A | 4/1980 | Anderson et al. | 4,937,554 A | 6/1990 | Herman |
| 4,199,930 A | 4/1980 | Lebet et al. | 4,962,685 A | 10/1990 | Hagstrom |
| 4,200,002 A | 4/1980 | Takahashi | 4,964,450 A | 10/1990 | Hughes et al. |
| 4,206,666 A | 6/1980 | Ashton | 4,965,909 A | 10/1990 | McCullough et al. |
| 4,206,910 A | 6/1980 | Biesemeyer | 4,969,063 A | 11/1990 | Scott et al. |
| 4,249,117 A | 2/1981 | Leukhardt et al. | 4,975,798 A | 12/1990 | Edwards et al. |
| 4,249,442 A | 2/1981 | Fittery | 5,020,406 A | 6/1991 | Sasaki et al. |
| 4,251,599 A | 2/1981 | McCormick | 5,025,175 A | 6/1991 | Dubois, III |
| 4,255,995 A | 3/1981 | Connor | 5,042,348 A | 8/1991 | Brundage et al. |
| 4,262,278 A | 4/1981 | Howard et al. | 5,046,426 A | 9/1991 | Julien et al. |
| 4,267,914 A | 5/1981 | Saar | 5,052,255 A | 10/1991 | Gaines |
| 4,270,427 A | 6/1981 | Colberg et al. | 5,074,047 A | 12/1991 | King |
| 4,276,459 A | 6/1981 | Willett et al. | 5,081,406 A | 1/1992 | Hughes et al. |
| 4,276,799 A | 7/1981 | Muehling | 5,082,316 A | 1/1992 | Wardlaw |
| 4,291,794 A | 9/1981 | Bauer | 5,083,973 A | 1/1992 | Townsend |
| 4,305,442 A | 12/1981 | Currie | 5,086,890 A | 2/1992 | Turczyn et al. |
| 4,319,146 A | 3/1982 | Wires, Sr. | 5,094,000 A | 3/1992 | Becht et al. |
| 4,321,841 A | 3/1982 | Felix | 5,116,249 A | 5/1992 | Shiotani et al. |
| 4,334,450 A | 6/1982 | Benuzzi | 5,119,555 A | 6/1992 | Johnson |
| 4,372,202 A | 2/1983 | Cameron | 5,122,091 A | 6/1992 | Townsend |
| 4,374,552 A | 2/1983 | Dayen | 5,123,317 A | 6/1992 | Barnes, Jr. et al. |
| 4,385,539 A | 5/1983 | Meyerhoefer et al. | 5,146,714 A | 9/1992 | Liiber |
| 4,391,358 A | 7/1983 | Haeger | 5,174,349 A | 12/1992 | Svetlik et al. |
| 4,418,597 A | 12/1983 | Krusemark et al. | 5,184,534 A | 2/1993 | Lee |
| 4,427,042 A | 1/1984 | Mitchell et al. | 5,198,702 A | 3/1993 | McCullough et al. |
| 4,466,170 A | 8/1984 | Davis | 5,199,343 A | 4/1993 | OBanion |
| 4,466,233 A | 8/1984 | Thesman | 5,201,110 A | 4/1993 | Bane |
| 4,470,046 A | 9/1984 | Betsill | 5,201,684 A | 4/1993 | DeBois, III |
| 4,492,291 A | 1/1985 | Chometon et al. | 5,206,625 A | 4/1993 | Davis |
| 4,503,739 A | 3/1985 | Konieczka | 5,207,253 A | 5/1993 | Hoshino et al. |
| 4,510,489 A | 4/1985 | Anderson, III et al. | 5,212,621 A | 5/1993 | Panter |
| 4,512,224 A | 4/1985 | Terauchi | 5,218,189 A | 6/1993 | Hutchison |
| 4,518,043 A | 5/1985 | Anderson et al. | 5,230,269 A | 7/1993 | Shiotani et al. |
| 4,532,501 A | 7/1985 | Hoffman | 5,231,359 A | 7/1993 | Masuda et al. |
| 4,532,844 A | 8/1985 | Chang et al. | 5,231,906 A | 8/1993 | Kogej |
| 4,557,168 A | 12/1985 | Tokiwa | 5,239,978 A | 8/1993 | Plangetis |
| 4,559,858 A | 12/1985 | Laskowski et al. | 5,245,879 A | 9/1993 | McKeon |
| 4,560,033 A | 12/1985 | DeWoody et al. | 5,257,570 A | 11/1993 | Shiotani et al. |
| 4,566,512 A | 1/1986 | Wilson | 5,265,510 A | 11/1993 | Hoyer-Ellefsen |
| 4,573,556 A | 3/1986 | Andreasson | 5,272,946 A | 12/1993 | McCullough et al. |
| 4,576,073 A | 3/1986 | Stinson | 5,276,431 A | 1/1994 | Piccoli et al. |
| 4,589,047 A | 5/1986 | Gaus et al. | 5,285,708 A | 2/1994 | Bosten et al. |
| 4,589,860 A | 5/1986 | Brandenstein et al. | 5,293,802 A | 3/1994 | Shiontani et al. |
| 4,599,597 A | 7/1986 | Rotbart | 5,320,382 A | 6/1994 | Goldstein et al. |
| 4,599,927 A | 7/1986 | Eccardt et al. | 5,321,230 A | 6/1994 | Shanklin et al. |
| 4,606,251 A | 8/1986 | Boileau | 5,331,875 A | 7/1994 | Mayfield |
| 4,615,247 A | 10/1986 | Berkeley | 5,353,670 A | 10/1994 | Metzger, Jr. |
| 4,621,300 A | 11/1986 | Summerer | 5,377,554 A | 1/1995 | Reulein et al. |
| 4,625,604 A | 12/1986 | Handler et al. | 5,377,571 A | 1/1995 | Josephs |
| 4,637,188 A | 1/1987 | Crothers | 5,392,568 A | 2/1995 | Howard, Jr. et al. |
| 4,637,289 A | 1/1987 | Ramsden | 5,392,678 A | 2/1995 | Sasaki et al. |
| 4,644,832 A | 2/1987 | Smith | 5,401,928 A | 3/1995 | Kelley |
| 4,653,189 A | 3/1987 | Andreasson | 5,411,221 A | 5/1995 | Collins et al. |
| 4,657,428 A | 4/1987 | Wiley | 5,423,232 A | 6/1995 | Miller et al. |
| 4,661,797 A | 4/1987 | Schmall | 5,436,613 A | 7/1995 | Ghosh et al. |
| 4,672,500 A | 6/1987 | Tholome et al. | 5,447,085 A | 9/1995 | Gochnauer |
| 4,675,664 A | 6/1987 | Cloutier et al. | 5,451,750 A | 9/1995 | An |
| 4,679,719 A | 7/1987 | Kramer | 5,453,903 A | 9/1995 | Chow |
| 4,694,721 A | 9/1987 | Brickner, Jr. | 5,471,888 A | 12/1995 | McCormick |
| 4,718,229 A | 1/1988 | Riley | 5,480,009 A | 1/1996 | Wieland et al. |
| 4,721,023 A | 1/1988 | Bartlett et al. | 5,503,059 A | 4/1996 | Pacholok |
| 4,722,021 A | 1/1988 | Hornung et al. | 5,510,587 A | 4/1996 | Reiter |
| 4,751,603 A | 6/1988 | Kwan | 5,510,685 A | 4/1996 | Grasselli |
| 4,756,220 A | 7/1988 | Olsen et al. | 5,513,548 A | 5/1996 | Garuglieri |
| 4,757,881 A | 7/1988 | Jonsson et al. | 5,531,147 A | 7/1996 | Serban |
| 4,774,866 A | 10/1988 | Dehari et al. | 5,534,836 A | 7/1996 | Schenkel et al. |
| 4,792,965 A | 12/1988 | Morgan | 5,572,916 A | 11/1996 | Takano |
| 4,805,504 A | 2/1989 | Fushiya et al. | 5,587,618 A | 12/1996 | Hathaway |
| 4,831,279 A | 5/1989 | Ingraham | 5,592,353 A | 1/1997 | Shinohara et al. |

| | | | | | | |
|---|---|---|---|---|---|---|
| 5,606,889 | A | 3/1997 | Bielinski et al. | 6,427,570 | B1 | 8/2002 | Miller et al. |
| 5,619,896 | A | 4/1997 | Chen | 6,430,007 | B1 | 8/2002 | Jabbari |
| 5,623,860 | A | 4/1997 | Schoene et al. | 6,431,425 | B1 | 8/2002 | Moorman et al. |
| 5,647,258 | A | 7/1997 | Brazell et al. | 6,450,077 | B1 | 9/2002 | Ceroll et al. |
| 5,648,644 | A | 7/1997 | Nagel | 6,453,786 | B1 | 9/2002 | Ceroll et al. |
| 5,659,454 | A | 8/1997 | Vermesse | 6,460,442 | B2 | 10/2002 | Talesky et al. |
| 5,667,152 | A | 9/1997 | Mooring | 6,471,106 | B1 | 10/2002 | Reining |
| 5,671,633 | A | 9/1997 | Wagner | 6,479,958 | B1 | 11/2002 | Thompson et al. |
| 5,695,306 | A | 12/1997 | Nygren, Jr. | 6,484,614 | B1 | 11/2002 | Huang |
| 5,700,165 | A | 12/1997 | Harris et al. | D466,913 | S | 12/2002 | Ceroll et al. |
| 5,720,213 | A | 2/1998 | Sbervelglieri | 6,492,802 | B1 | 12/2002 | Bielski |
| 5,722,308 | A | 3/1998 | Ceroll et al. | D469,354 | S | 1/2003 | Curtsinger |
| 5,724,875 | A | 3/1998 | Meredith et al. | 6,502,493 | B1 | 1/2003 | Eccardt et al. |
| 5,730,165 | A | 3/1998 | Philipp | 6,530,303 | B1 | 3/2003 | Parks et al. |
| 5,741,048 | A | 4/1998 | Eccleston | 6,536,536 | B1 | 3/2003 | Gass et al. |
| 5,755,148 | A | 5/1998 | Stumpf et al. | 6,543,324 | B2 | 4/2003 | Dils |
| 5,768,786 | A | 6/1998 | Kane et al. | 6,546,835 | B2 | 4/2003 | Wang |
| 5,771,742 | A | 6/1998 | Bokaie et al. | 6,564,909 | B1 | 5/2003 | Razzano |
| 5,782,001 | A | 7/1998 | Gray | 6,575,067 | B2 | 6/2003 | Parks et al. |
| 5,787,779 | A | 8/1998 | Garuglieri | 6,578,460 | B2 | 6/2003 | Sartori |
| 5,791,057 | A | 8/1998 | Nakamura et al. | 6,578,856 | B2 | 6/2003 | Kahle |
| 5,791,223 | A | 8/1998 | Lanzer | 6,581,655 | B2 | 6/2003 | Huang |
| 5,791,224 | A | 8/1998 | Suzuki et al. | 6,595,096 | B2 | 7/2003 | Ceroll et al. |
| 5,791,441 | A | 8/1998 | Matos et al. | D478,917 | S | 8/2003 | Ceroll et al. |
| 5,797,307 | A | 8/1998 | Horton | 6,601,493 | B1 | 8/2003 | Crofutt |
| 5,819,619 | A | 10/1998 | Miller et al. | 6,607,015 | B1 | 8/2003 | Chen |
| 5,819,625 | A | 10/1998 | Sberveglieri | D479,538 | S | 9/2003 | Welsh et al. |
| 5,852,951 | A | 12/1998 | Santi | 6,617,720 | B1 | 9/2003 | Egan, III et al. |
| 5,857,507 | A | 1/1999 | Puzio et al. | 6,619,348 | B2 | 9/2003 | Wang |
| 5,861,809 | A | 1/1999 | Eckstein et al. | 6,640,683 | B2 | 11/2003 | Lee |
| 5,875,698 | A | 3/1999 | Ceroll et al. | 6,644,157 | B2 | 11/2003 | Huang |
| 5,880,954 | A | 3/1999 | Thomson et al. | 6,647,847 | B2 | 11/2003 | Hewitt et al. |
| 5,921,367 | A | 7/1999 | Kashioka et al. | 6,659,233 | B2 | 12/2003 | DeVlieg |
| 5,927,857 | A | 7/1999 | Ceroll et al. | 6,684,750 | B2 | 2/2004 | Yu |
| 5,930,096 | A | 7/1999 | Kim | 6,722,242 | B2 | 4/2004 | Chuang |
| 5,937,720 | A | 8/1999 | Itzov | 6,734,581 | B1 | 5/2004 | Griffis |
| 5,942,975 | A | 8/1999 | Sorensen | 6,736,042 | B2 | 5/2004 | Behne et al. |
| 5,943,932 | A | 8/1999 | Sberveglieri | 6,742,430 | B2 | 6/2004 | Chen |
| 5,950,514 | A | 9/1999 | Benedict et al. | 6,796,208 | B1 | 9/2004 | Jorgensen |
| 5,963,173 | A | 10/1999 | Lian et al. | 6,800,819 | B2 | 10/2004 | Sato et al. |
| 5,974,927 | A | 11/1999 | Tsune | 6,826,988 | B2 | 12/2004 | Gass et al. |
| 5,989,116 | A | 11/1999 | Johnson et al. | 6,826,992 | B1 | 12/2004 | Huang |
| 6,009,782 | A | 1/2000 | Tajima et al. | 6,840,144 | B2 | 1/2005 | Huang |
| 6,018,284 | A | 1/2000 | Rival et al. | 6,854,371 | B2 | 2/2005 | Yu |
| 6,037,729 | A | 3/2000 | Woods et al. | 6,857,345 | B2 | 2/2005 | Gass et al. |
| D422,290 | S | 4/2000 | Welsh et al. | 6,874,397 | B2 | 4/2005 | Chang |
| 6,052,884 | A | 4/2000 | Steckler et al. | 6,874,399 | B2 | 4/2005 | Lee |
| 6,062,121 | A | 5/2000 | Ceroll et al. | 6,877,410 | B2 | 4/2005 | Gass et al. |
| 6,070,484 | A | 6/2000 | Sakamaki | 6,880,440 | B2 | 4/2005 | Gass et al. |
| 6,095,092 | A | 8/2000 | Chou | 6,883,397 | B2 | 4/2005 | Kimizuka |
| 6,112,785 | A | 9/2000 | Yu | 6,889,585 | B1 | 5/2005 | Harris et al. |
| 6,119,984 | A | 9/2000 | Devine | 6,920,814 | B2 | 7/2005 | Gass et al. |
| 6,131,629 | A | 10/2000 | Puzio et al. | 6,922,153 | B2 | 7/2005 | Pierga et al. |
| 6,133,818 | A | 10/2000 | Shieh et al. | 6,945,148 | B2 | 9/2005 | Gass et al. |
| 6,141,192 | A | 10/2000 | Garzon | 6,945,149 | B2 | 9/2005 | Gass et al. |
| 6,148,504 | A | 11/2000 | Schmidt et al. | 6,968,767 | B2 | 11/2005 | Yu |
| 6,148,526 | A | 11/2000 | Kirn et al. | 6,986,370 | B1 | 1/2006 | Schoene et al. |
| 6,148,703 | A | 11/2000 | Ceroll et al. | 6,994,004 | B2 | 2/2006 | Gass et al. |
| 6,150,826 | A | 11/2000 | Hokodate et al. | 6,997,090 | B2 | 2/2006 | Gass et al. |
| 6,161,459 | A | 12/2000 | Ceroll et al. | 7,000,514 | B2 | 2/2006 | Gass et al. |
| 6,170,370 | B1 | 1/2001 | Sommerville | 7,024,975 | B2 | 4/2006 | Gass et al. |
| 6,244,149 | B1 | 6/2001 | Ceroll et al. | 7,055,417 | B1 | 6/2006 | Gass et al. |
| 6,250,190 | B1 | 6/2001 | Ceroll et al. | 7,077,039 | B2 | 7/2006 | Gass et al. |
| 6,257,061 | B1 | 7/2001 | Nonoyama et al. | 7,098,800 | B2 | 8/2006 | Gass |
| 6,283,002 | B1 | 9/2001 | Chiang | 7,100,483 | B2 | 9/2006 | Gass et al. |
| 6,295,910 | B1 | 10/2001 | Childs et al. | 7,137,326 | B2 | 11/2006 | Gass et al. |
| 6,312,028 | B1 | 11/2001 | Wilkosz | 2002/0017175 | A1 | 2/2002 | Gass et al. |
| 6,325,195 | B1 | 12/2001 | Doherty | 2002/0017176 | A1 | 2/2002 | Gass et al. |
| 6,330,848 | B1 | 12/2001 | Nishio et al. | 2002/0017178 | A1 | 2/2002 | Gass et al. |
| 6,336,273 | B1 | 1/2002 | Nilsson et al. | 2002/0017179 | A1 | 2/2002 | Gass et al. |
| 6,352,137 | B1 | 3/2002 | Stegall et al. | 2002/0017180 | A1 | 2/2002 | Gass et al. |
| 6,357,328 | B1 | 3/2002 | Ceroll et al. | 2002/0017181 | A1 | 2/2002 | Gass et al. |
| 6,361,092 | B1 | 3/2002 | Eagle et al. | 2002/0017182 | A1 | 2/2002 | Gass et al. |
| 6,366,099 | B1 | 4/2002 | Reddi | 2002/0017183 | A1 | 2/2002 | Gass et al. |
| 6,376,939 | B1 | 4/2002 | Suzuki et al. | 2002/0017184 | A1 | 2/2002 | Gass et al. |
| 6,404,098 | B1 | 6/2002 | Kayama et al. | 2002/0017336 | A1 | 2/2002 | Gass et al. |
| 6,405,624 | B2 | 6/2002 | Sutton | 2002/0020261 | A1 | 2/2002 | Gass et al. |
| 6,418,829 | B1 | 7/2002 | Pilchowski | 2002/0020262 | A1 | 2/2002 | Gass et al. |
| 6,420,814 | B1 | 7/2002 | Bobbio | 2002/0020263 | A1 | 2/2002 | Gass et al. |

| | | | |
|---|---|---|---|
| 2002/0020265 A1 | 2/2002 | Gass et al. | |
| 2002/0020271 A1 | 2/2002 | Gass et al. | |
| 2002/0043776 A1 | 4/2002 | Chuang | |
| 2002/0050201 A1 | 5/2002 | Lane et al. | |
| 2002/0056348 A1 | 5/2002 | Gass et al. | |
| 2002/0056349 A1 | 5/2002 | Gass et al. | |
| 2002/0056350 A1 | 5/2002 | Gass et al. | |
| 2002/0059853 A1 | 5/2002 | Gass et al. | |
| 2002/0059854 A1 | 5/2002 | Gass et al. | |
| 2002/0069734 A1 | 6/2002 | Gass et al. | |
| 2002/0088325 A1 | 7/2002 | Talesky et al. | |
| 2002/0096030 A1 | 7/2002 | Wang | |
| 2002/0096591 A1 | 7/2002 | Tanji | |
| 2002/0109036 A1 | 8/2002 | Denen et al. | |
| 2002/0134212 A1 | 9/2002 | Ceroll et al. | |
| 2002/0170399 A1 | 11/2002 | Gass et al. | |
| 2002/0170400 A1 | 11/2002 | Gass | |
| 2002/0174755 A1 | 11/2002 | Behne et al. | |
| 2002/0190581 A1 | 12/2002 | Gass et al. | |
| 2003/0000359 A1 | 1/2003 | Eccardt et al. | |
| 2003/0002942 A1 | 1/2003 | Gass et al. | |
| 2003/0005588 A1 | 1/2003 | Gass et al. | |
| 2003/0015253 A1 | 1/2003 | Gass et al. | |
| 2003/0019341 A1 | 1/2003 | Gass et al. | |
| 2003/0020336 A1 | 1/2003 | Gass et al. | |
| 2003/0037651 A1 | 2/2003 | Gass et al. | |
| 2003/0037655 A1 | 2/2003 | Chin-Chin | |
| 2003/0056853 A1 | 3/2003 | Gass et al. | |
| 2003/0058121 A1 | 3/2003 | Gass et al. | |
| 2003/0074873 A1 | 4/2003 | Freiberg et al. | |
| 2003/0089212 A1 | 5/2003 | Parks et al. | |
| 2003/0090224 A1 | 5/2003 | Gass et al. | |
| 2003/0101857 A1 | 6/2003 | Chuang | |
| 2003/0109798 A1 | 6/2003 | Kermani | |
| 2003/0131703 A1 | 7/2003 | Gass et al. | |
| 2003/0140749 A1 | 7/2003 | Gass et al. | |
| 2003/0213349 A1 | 11/2003 | Chang | |
| 2004/0011177 A1 | 1/2004 | Huang | |
| 2004/0040426 A1 | 3/2004 | Gass et al. | |
| 2004/0060404 A1 | 4/2004 | Metzger, Jr. | |
| 2004/0104085 A1 | 6/2004 | Lang et al. | |
| 2004/0159198 A1 | 8/2004 | Peot et al. | |
| 2004/0194594 A1 | 10/2004 | Dils et al. | |
| 2004/0200329 A1 | 10/2004 | Sako | |
| 2004/0226424 A1 | 11/2004 | O'Banion et al. | |
| 2004/0226800 A1* | 11/2004 | Pierga et al. | 192/129 R |
| 2004/0255745 A1 | 12/2004 | Peot et al. | |
| 2005/0057206 A1 | 3/2005 | Uneyama | |
| 2005/0066784 A1 | 3/2005 | Gass | |
| 2005/0092149 A1 | 5/2005 | Hartmann | |
| 2005/0139051 A1 | 6/2005 | Gass et al. | |
| 2005/0139056 A1 | 6/2005 | Gass et al. | |
| 2005/0139057 A1 | 6/2005 | Gass et al. | |
| 2005/0139058 A1 | 6/2005 | Gass et al. | |
| 2005/0139459 A1 | 6/2005 | Gass et al. | |
| 2005/0155473 A1 | 7/2005 | Gass | |
| 2005/0166736 A1 | 8/2005 | Gass et al. | |
| 2005/0178259 A1 | 8/2005 | Gass et al. | |
| 2005/0204885 A1 | 9/2005 | Gass et al. | |
| 2005/0211034 A1 | 9/2005 | Sasaki et al. | |
| 2005/0235793 A1 | 10/2005 | O'Banion et al. | |
| 2005/0268767 A1* | 12/2005 | Pierga et al. | 83/581 |
| 2005/0274432 A1 | 12/2005 | Gass et al. | |
| 2006/0000337 A1 | 1/2006 | Gass | |
| 2006/0032352 A1 | 2/2006 | Gass et al. | |
| 2006/0123960 A1 | 6/2006 | Gass et al. | |
| 2006/0123964 A1 | 6/2006 | Gass et al. | |
| 2006/0179983 A1 | 8/2006 | Gass et al. | |
| 2006/0219076 A1 | 10/2006 | Gass et al. | |
| 2006/0225551 A1 | 10/2006 | Gass | |
| 2006/0230896 A1 | 10/2006 | Gass | |
| 2006/0247795 A1 | 11/2006 | Gass et al. | |
| 2006/0254401 A1 | 11/2006 | Gass et al. | |
| 2006/0272463 A1 | 12/2006 | Gass | |

FOREIGN PATENT DOCUMENTS

| | | |
|---|---|---|
| CH | 297525 | 6/1954 |
| DE | 76186 | 8/1921 |
| DE | 2917497 | 4/1979 |
| DE | 2800403 | 7/1979 |
| DE | 3427733 | 1/1986 |
| DE | 4205965 C1 | 2/1992 |
| DE | 4235161 A1 | 5/1993 |
| DE | 4326313 | 2/1995 |
| DE | 19609771 | 6/1998 |
| DE | 20102704 | 2/2001 |
| EP | 146460 | 11/1988 |
| ES | 2152184 | 1/2001 |
| FR | 2556643 | 6/1985 |
| FR | 2570017 | 3/1986 |
| GB | 598204 | 2/1948 |
| GB | 1132708 | 11/1968 |
| GB | 2096844 | 10/1982 |
| GB | 2142571 | 1/1985 |
| JP | 06328359 | 11/1994 |

OTHER PUBLICATIONS

U.S. Appl. No. 60/157,340, filed Oct. 1, 1999, entitled "Fast-Acting Safety Stop."
U.S. Appl. No. 60/182,866, filed Feb. 16, 2000, entitled "Fast-Acting Safety Stop."
IWF 2000 Challengers Award Official Entry Form, submitted Apr. 26, 2000, 6 pages plus video (the portions of U.S. patent applications referenced in the form are from U.S. Appl. No. 60/157,340, filed Oct. 1, 1999 and U.S. Appl. No. 60/182,866, filed Feb. 16, 2000).
*You Should Have Invented It*, French television show CD.
Analog Devices, Inc., 3-Axis Capacitive Sensor—Preliminary Technical Data AD7103, pp. 1-40, © 1998.
Skil Model 3400-Type 1 10" Table Saw Parts List and Technical Bulletin, S-B Power Tool Company, Jun. 1993.
Shop Fox® Fence Operating Manual, Woodstock International, Inc., 1996, revised May 1997.
Excaliber T-Slot Precision Saw Fence Model. TT45 Owner's Manual, Sommerville Design & Manufacturing, Inc., May 2000.
Bosch Model 4000 Worksite Table Saw Operating/Safety Instructions, S-B Power Tool Company, Jul. 2000.
XACTA Fence II™ Homeshop 30/52 Owner's Manual, JET Equipment & Tools, Mar. 2001.
XACTA Fence II™ Commercial 30/50 Owner's Manual, JET Equipment & Tools, Mar. 2001.
Bosch 10" Table Saw Model 0601476139 Parts List and Technical Bulletin, S-B Power Tool Company, Apr. 2001.
Biesemeyer® T-Square® Universal Home Shop Fence system Instruction Manual, Delta Machinery, Jun. 1, 2001.
Powermatic 10" Tilting Arbor Saw Model 66 Instruction Manual & Parts List, JET Equipment & Tools, Jun. 2001.
Skil Model 3400 Table Saw Operating/Safety Instructions, S-B Power Tool Co., Sep. 2001.
*Tablesaw Splitters and Blade Covers*, Fine Woodworking, pp. 77-81, Dec. 2001.
The Merlin Splitter by Excalibur a Sommerville Design Product Overview & Generic Installation Notes, Sommerville Design & Manufacturing Inc., at least as early as 2002.
INCRA Incremental Micro Precision Table Saw Fence Owner's Manual, Taylor Design Group, Inc., 2003.
Craftsman® Power and Hand Tools, pp. 142-143, 2003.
Shop Fox® Models W2005, W2006, W2007 Classic Fence Instruction Manual, Woodstock International, Jan. 2000, revised Mar. 2004.
ACCU-FENCE® 64A Fence and Rail System Owner's Manual, WMH Tool Group, Sep. 2004.
Unifence™ Saw Guide Instruction Manual, Delta Machinery, Feb. 22, 2005.
Biesemeyer® T-Square® Commercial Fence System Instruction Manual, Delta Machinery, May 2, 2005.
*Young Inventor: Teen's Device Earns Her Trip to Science Fair*, The Arizona Republic, May 5, 2006.
Operator Injury Mitigation Using Electronic Sensing and Mechanical Braking and Decoupling Devices in Handheld Circular Saws, Erin F. Eppard, date unknown.
Grizzly Industrial, Inc. Model G0605X/G0606X Extreme Series 12" Table Saw Owner's Manual, Grizzly Industrial, Inc., Oct. 2006.
Laguna Tools table saw owner's manual, date unknown.

* cited by examiner

SAFETY METHODS FOR USE IN POWER EQUIPMENT

CROSS-REFERENCE TO RELATED APPLICATIONS

This application is a continuation of the following U.S. Patent Applications, all of which are hereby incorporated by reference: Ser. No. 09/676,190, filed Sep. 29, 2000 now U.S. Pat. No. 7,055,417, Ser. No. 09/929,221, filed Aug. 13, 2001, Ser. No. 09/929,226, filed Aug. 13, 2001 now U.S. Pat. No. 6,920,814, Ser. No. 09/929,227, filed Aug. 13, 2001, Ser. No. 09/929,234, filed Aug. 13, 2001, Ser. No. 09/929,235, filed Aug. 13, 2001, Ser. No. 09/929,236, filed Aug. 13, 2001 now abandoned, Ser. No. 09/929,237, filed Aug. 13, 2001, Ser. No. 09/929,238, filed Aug. 13, 2001, Ser. No. 09/929,240, filed Aug. 13, 2001 now U.S. Pat. No. 7,100,483, Ser. No. 09/929,241, filed Aug. 13, 2001 now U.S. Pat. No. 7,024,975, Ser. No. 09/929,242, filed Aug. 13, 2001, Ser. No. 09/929,244, filed Aug. 13, 2001 now U.S. Pat. No. 6,857,345, Ser. No. 09/929,425, filed Aug. 13, 2001 now U.S. Pat. No. 7,137,326, Ser. No. 09/929,426, filed Aug. 13, 2001, Ser. No. 09/955,418, filed Sep. 17, 2001 now U.S. Pat. No. 6,957,601, Ser. No. 10/047,066, filed Jan. 14, 2002 now U.S. Pat. No. 6,945,148, Ser. No. 10/051,782, filed Jan. 15, 2002 now U.S. Pat. No. 6,877,410, Ser. No. 10/052,273, filed Jan. 16, 2002 now U.S. Pat. No. 6,813,983, Ser. No. 10/052,274, filed Jan. 16, 2002 now U.S. Pat. No. 6,826,988, Ser. No. 10/052,705, filed Jan. 16, 2002 now U.S. Pat. No. 6,994,004, Ser. No. 10/052,806, filed Jan. 16, 2002 now U.S. Pat. No. 6,880,440, Ser. No. 10/053,390, filed Jan. 16, 2002, Ser. No. 10/100,211, filed Mar. 13, 2002, Ser. No. 10/146,527, filed May 15, 2002, Ser. No. 10/172,553, filed Jun. 13, 2002, Ser. No. 10/189,031, filed Jul. 2, 2002, Ser. No. 10/189,027, filed Jul. 2, 2002, Ser. No. 10/197,975, filed Jul. 18, 2002 now abandoned, Ser. No. 10/202,928, filed Jul. 25, 2002 now U.S. Pat. No. 7,000,514, Ser. No. 10/205,164, filed Jul. 25, 2002 now U.S. Pat. No. 6,945,149, Ser. No. 10/243,042, filed Sep. 13, 2002, Ser. No. 10/251,576, filed Sep. 20, 2002 now abandoned, Ser. No. 10/292,607, filed Nov. 12, 2002 now U.S. Pat. No. 7,077,039, Ser. No. 10/345,630, filed Jan. 15, 2003, Ser. No. 10/341,260, filed Jan. 13, 2003, Ser. No. 10/643,296, filed Aug. 18, 2003 now abandoned, Ser. No. 10/785,361, filed Feb. 23, 2004 now U.S. Pat. No. 6,997,090, which is a continuation of Ser. No. 10/215,929, filed Aug. 9, 2002, now abandoned, and Ser. No. 10/932,339, filed Sep. 1, 2004, which is a continuation of Ser. No. 10/047,066 now U.S. Pat. No. 6,945,148 and Ser. No. 10/050,085 now abandoned, both filed Jan. 14, 2002.

FIELD

The present invention relates to safety systems and more particularly to methods for enhancing the safety of power equipment.

BACKGROUND

Power equipment such as table saws, miter saws and other woodworking machinery include cutting tools like circular saw blades and knife blades that present a risk of injury to a user of the equipment. Accordingly, safety features or systems are incorporated with power equipment to minimize the risk of injury. Probably the most common safety feature is a guard that physically blocks an operator from making contact with dangerous components of machinery, such as belts, shafts or blades. In many cases, guards effectively reduce the risk of injury, however, there are many instances where the nature of the operations to be performed precludes using a guard that completely blocks access to hazardous machine parts.

Other safety systems try to prevent or minimize injury by detecting and reacting to an event. For instance, U.S. Pat. Nos. 3,953,770, 4,075,961, 4,470,046, 4,532,501 and 5,212,621, the disclosures of which are incorporated herein by reference, disclose radio-frequency safety systems which utilize radio-frequency signals to detect the presence of a user's hand in a dangerous area of the machine and thereupon prevent or interrupt operation of the machine. U.S. Pat. Nos. 3,785,230 and 4,026,177, the disclosures of which are herein incorporated by reference, disclose a safety system for use on circular saws to stop the blade when a user's hand approaches the blade. The system uses the blade as an antenna in an electromagnetic proximity detector to detect the approach of a user's hand prior to actual contact with the blade. Upon detection of a user's hand, the system engages a brake using a standard solenoid.

U.S. Pat. No. 4,117,752, which is herein incorporated by reference, discloses a braking system for use with a band saw, where the brake is triggered by actual contact between the user's hand and the blade. However, the system described for detecting blade contact does not appear to be functional to accurately and reliably detect contact. Furthermore, the system relies on standard electromagnetic brakes operating off of line voltage to stop the blade and pulleys of the band saw. It is believed that such brakes would take 50 ms-1 s to stop the blade. Therefore, the system is too slow to stop the blade quickly enough to avoid serious injury.

DETAILED DESCRIPTION

Figure 1:
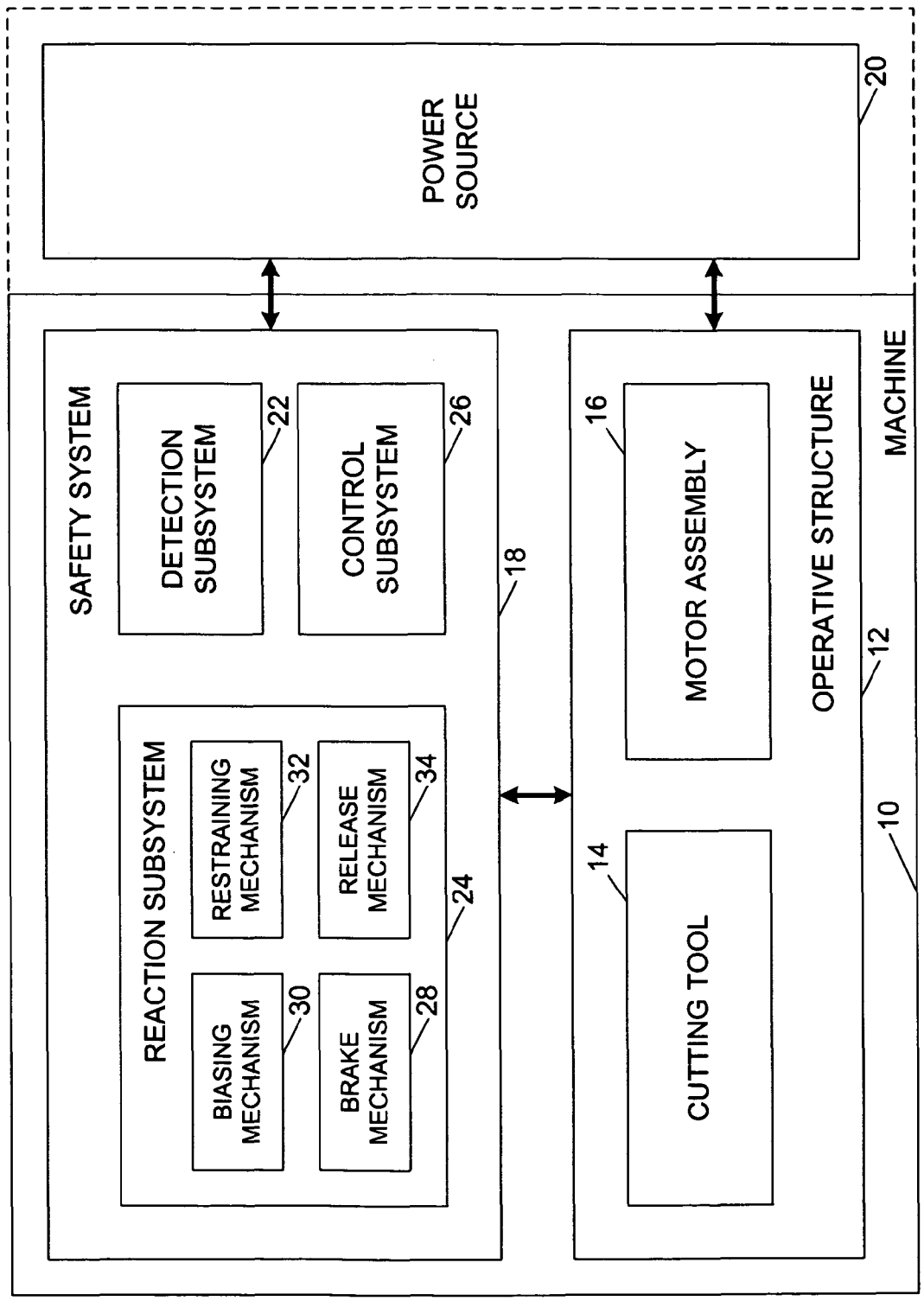
FIG. 1 is a schematic block diagram of a machine with a fast-acting safety system.

A machine that may incorporate a retraction system according to the present invention is shown schematically in FIG. 1 and indicated generally at 10. Machine 10 may be any of a variety of different machines adapted for cutting workpieces, such as wood, including a table saw, miter saw (chop saw), radial arm saw, circular saw, band saw, jointer, planer, etc. Machine 10 includes an operative structure 12 having a cutting tool 14 and a motor assembly 16 adapted to drive the cutting tool. Machine 10 also includes a safety system 18 configured to minimize the potential of a serious injury to a person using machine 10. Safety system 18 is adapted to detect the occurrence of one or more dangerous conditions during use of machine 10. If such a dangerous condition is detected, safety system 18 is adapted to engage operative structure 12 to limit any injury to the user caused by the dangerous condition.

Machine 10 also includes a suitable power source 20 to provide power to operative structure 12 and safety system 18. Power source 20 may be an external power source such as line current, or an internal power source such as a battery. Alternatively, power source 20 may include a combination of both external and internal power sources. Furthermore, power source 20 may include two or more separate power sources, each adapted to power different portions of machine 10.

It will be appreciated that operative structure 12 may take any one of many different forms, depending on the type of machine 10. For example, operative structure 12 may include a stationary housing configured to support motor assembly 16 in driving engagement with cutting tool 14. Alternatively, operative structure 12 may include a movable structure configured to carry cutting tool 14 between multiple operating positions. As a further alternative, operative structure 12 may include one or more transport mechanisms adapted to convey a workpiece toward and/or away from cutting tool 14.

Motor assembly 16 includes one or more motors adapted to drive cutting tool 14. The motors may be either directly or indirectly coupled to the cutting tool, and may also be adapted to drive workpiece transport mechanisms. Cutting tool 14 typically includes one or more blades or other suitable cutting implements that are adapted to cut or remove portions from the workpieces. The particular form of cutting tool 14 will vary depending upon the various embodiments of machine 10. For example, in table saws, miter saws, circular saws and radial arm saws, cutting tool 14 will typically include one or more circular rotating blades having a plurality of teeth disposed along the perimetrical edge of the blade. For a jointer or planer, the cutting tool typically includes a plurality of radially spaced-apart blades. For a band saw, the cutting tool includes an elongate, circuitous tooth-edged band.

Safety system 18 includes a detection subsystem 22, a reaction subsystem 24 and a control subsystem 26. Control subsystem 26 may be adapted to receive inputs from a variety of sources including detection subsystem 22, reaction subsystem 24, operative structure 12 and motor assembly 16. The control subsystem may also include one or more sensors adapted to monitor selected parameters of machine 10. In addition, control subsystem 26 typically includes one or more instruments operable by a user to control the machine. The control subsystem is configured to control machine 10 in response to the inputs it receives.

Detection subsystem 22 is configured to detect one or more dangerous, or triggering, conditions during use of machine 10. For example, the detection subsystem may be configured to detect that a portion of the user's body is dangerously close to, or in contact with, a portion of cutting tool 14. As another example, the detection subsystem may be configured to detect the rapid movement of a workpiece due to kickback by the cutting tool, as is described in U.S. Provisional Patent Application Ser. Nos. 60/182,866, the disclosure of which is herein incorporated by reference. In some embodiments, detection subsystem 22 may inform control subsystem 26 of the dangerous condition, which then activates reaction subsystem 24. In other embodiments, the detection subsystem may be adapted to activate the reaction subsystem directly.

Once activated in response to a dangerous condition, reaction subsystem 24 is configured to engage operative structure 12 quickly to prevent serious injury to the user. It will be appreciated that the particular action to be taken by reaction subsystem 24 will vary depending on the type of machine 10 and/or the dangerous condition that is detected. For example, reaction subsystem 24 may be configured to do one or more of the following: stop the movement of cutting tool 14, disconnect motor assembly 16 from power source 20, place a barrier between the cutting tool and the user, or retract the cutting tool from its operating position, etc. The reaction subsystem may be configured to take a combination of steps to protect the user from serious injury. Placement of a barrier between the cutting tool and teeth is described in more detail in U.S. Provisional Patent Application Ser. No. 60/225,206, entitled "Cutting Tool Safety System," filed Aug. 14, 2000 by SD3, LLC, the disclosure of which is herein incorporated by reference.

The configuration of reaction subsystem 24 typically will vary depending on which action(s) are taken. In the exemplary embodiment depicted in FIG. 1, reaction subsystem 24 is configured to stop the movement of cutting tool 14 and includes a brake mechanism 28, a biasing mechanism 30, a restraining mechanism 32, and a release mechanism 34. Brake mechanism 28 is adapted to engage operative structure 12 under the urging of biasing mechanism 30. During normal operation of machine 10, restraining mechanism 32 holds the brake mechanism out of engagement with the operative structure. However, upon receipt of an activation signal by reaction subsystem 24, the brake mechanism is released from the restraining mechanism by release mechanism 34, whereupon, the brake mechanism quickly engages at least a portion of the operative structure to bring the cutting tool to a stop.

Figure 2:
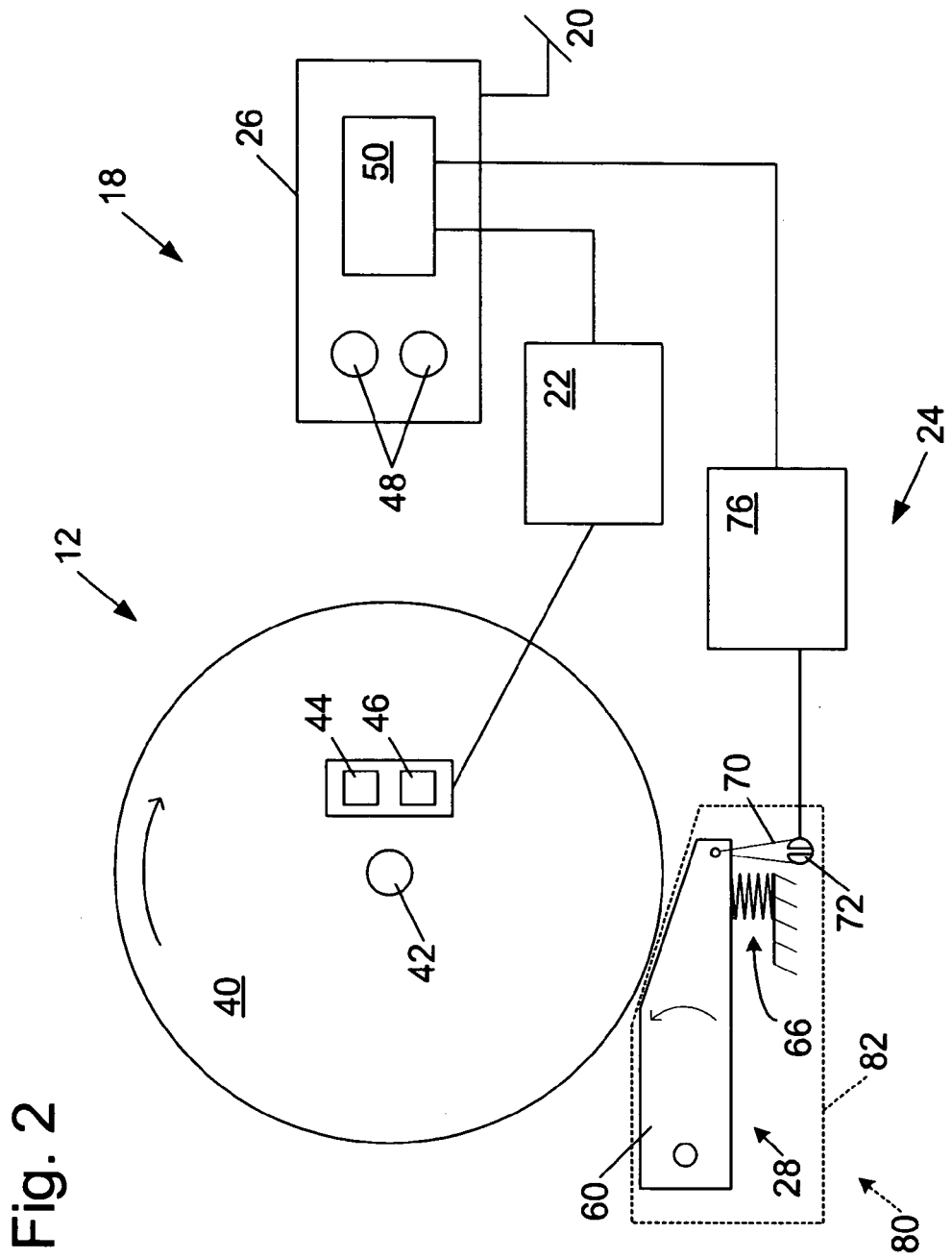
FIG. 2 is a schematic diagram of an exemplary safety system in the context of a machine having a circular blade.

It will be appreciated by those of skill in the art that the exemplary embodiment depicted in FIG. 1 and described above may be implemented in a variety of ways depending on the type and configuration of operative structure 12. Turning attention to FIG. 2, one example of the many possible implementations of safety system 18 is shown. System 18 is configured to engage an operative structure having a cutting tool in the form of a circular blade 40 mounted on a rotating shaft or arbor 42. Blade 40 includes a plurality of cutting teeth (not shown) disposed around the outer edge of the blade. As described in more detail below, braking mechanism 28 is adapted to engage the teeth of blade 40 and stop the rotation of the blade. U.S. Provisional Patent Application Ser. No. 60/225,210, entitled "Translation Stop For Use In Power Equipment," filed Aug. 14, 2000 by SD3, LLC, the disclosure of which is herein incorporated by reference, describes other systems for stopping the movement of the cutting tool. U.S. Provisional Patent Application Ser. No. 60/225,058, entitled "Table Saw With Improved Safety System," filed Aug. 14, 2000 by SD3, LLC, and U.S. Provisional Patent Application Ser. No. 60/225,057, entitled "Miter Saw With Improved Safety System," filed Aug. 14, 2000 by SD3, LLC, the disclosures of which are herein incorporated by reference, describe safety system 18 in the context of particular types of machines 10.

In the exemplary implementation, detection subsystem 22 is adapted to detect the dangerous condition of the user coming into contact with blade 40. The detection subsystem includes a sensor assembly, such as contact detection plates 44 and 46, capacitively coupled to blade 40 to detect any contact between the user's body and the blade. Typically, the blade, or some larger portion of cutting tool 14 is electrically isolated from the remainder of machine 10. Alternatively, detection subsystem 22 may include a different sensor assembly configured to detect contact in other ways, such as optically, resistively, etc. In any event, the detection subsystem is adapted to transmit a signal to control subsystem 26 when contact between the user and the blade is detected. Various exemplary embodiments and implementations of detection subsystem 22 are described in more detail in U.S. Provisional Patent Application Ser. No. 60/225,200, entitled "Contact Detection System For Power Equipment," filed Aug. 14, 2000 by SD3, LLC, and U.S. Provisional Patent Application Ser. No. 60/225,211, entitled "Apparatus And Method For Detecting Dangerous Conditions In Power Equipment," filed Aug. 14, 2000 by SD3, LLC, the disclosures of which are herein incorporated by reference.

Control subsystem 26 includes one or more instruments 48 that are operable by a user to control the motion of blade 40. Instruments 48 may include start/stop switches, speed controls, direction controls, etc. Control subsystem 26 also includes a logic controller 50 connected to receive the user's inputs via instruments 48. Logic controller 50 is also connected to receive a contact detection signal from detection subsystem 22. Further, the logic controller may be configured to receive inputs from other sources (not shown) such as blade motion sensors, workpiece sensors, etc. In any event, the logic controller is configured to control operative structure 12 in response to the user's inputs through instruments 48. However, upon receipt of a contact detection signal from detection subsystem 22, the logic controller overrides the control inputs from the user and activates reaction subsystem 24 to stop the motion of the blade. Various exemplary embodiments and implementations of control subsystem 26 are described in more detail in U.S. Provisional Patent Application Ser. No. 60/225,059, entitled "Logic Control For Fast Acting Safety System," filed Aug. 14, 2000 by SD3, LLC, and U.S. Provisional Patent Application Ser. No. 60/225,094, entitled "Motion Detecting System For Use In Safety System For Power Equipment," filed Aug. 14, 2000 by SD3, LLC, the disclosures of which are herein incorporated by reference.

In the exemplary implementation, brake mechanism 28 includes a pawl 60 mounted adjacent the edge of blade 40 and selectively moveable to engage and grip the teeth of the blade. Pawl 60 may be constructed of any suitable material adapted to engage and stop the blade. As one example, the pawl may be constructed of a relatively high strength thermoplastic material such as polycarbonate, ultrahigh molecular weight polyethylene (UHMW) or Acrylonitrile Butadiene Styrene (ABS), etc., or a metal such as aluminum, etc. It will be appreciated that the construction of pawl 60 will vary depending on the configuration of blade 40. In any event, the pawl is urged into the blade by a biasing mechanism in the form of a spring 66. In the illustrative embodiment shown in FIG. 2, pawl 60 is pivoted into the teeth of blade 40. It should be understood that sliding or rotary movement of pawl 60 might also be used. The spring is adapted to urge pawl 60 into the teeth of the blade with sufficient force to grip the blade and quickly bring it to a stop.

The pawl is held away from the edge of the blade by a restraining mechanism in the form of a fusible member 70. The fusible member is constructed of a suitable material adapted to restrain the pawl against the bias of spring 66, and also adapted to melt under a determined electrical current density. Examples of suitable materials for fusible member 70 include NiChrome wire, stainless steel wire, etc. The fusible member is connected between the pawl and a contact mount 72. Preferably, fusible member 70 holds the pawl relatively close to the edge of the blade to reduce the distance the pawl must travel to engage the blade. Positioning the pawl relatively close to the edge of the blade reduces the time required for the pawl to engage and stop the blade. Typically, the pawl is held approximately $\frac{1}{32}$-inch to $\frac{1}{4}$-inch from the edge of the blade by fusible member 70, however other pawl-to-blade spacings may also be used within the scope of the invention.

Pawl 60 is released from its unactuated, or cocked, position to engage blade 40 by a release mechanism in the form of a firing subsystem 76. The firing subsystem is coupled to contact mount 72, and is configured to melt fusible member 70 by passing a surge of electrical current through the fusible member. Firing subsystem 76 is coupled to logic controller 50 and activated by a signal from the logic controller. When the logic controller receives a contact detection signal from detection subsystem 22, the logic controller sends an activation signal to firing subsystem 76, which melts fusible member 70, thereby releasing the pawl to stop the blade. Various exemplary embodiments and implementations of reaction subsystem 24 are described in more detail in U.S. Provisional Patent Application Ser. No. 60/225,056, entitled "Firing Subsystem For Use In Fast Acting Safety System," filed Aug. 14, 2000 by SD3, LLC, U.S. Provisional Patent Application Ser. No. 60/225,170, entitled "Spring-Biased Brake Mechanism for Power Equipment," filed Aug. 14, 2000 by SD3, LLC, and U.S. Provisional Patent Application Ser. No. 60/225,169, entitled "Brake Mechanism For Power Equipment," filed Aug. 14, 2000 by SD3, LLC, the disclosures of which are herein incorporated by reference.

It will be appreciated that activation of the brake mechanism will require the replacement of one or more portions of safety system 18. For example, pawl 60 and fusible member 70 typically must be replaced before the safety system is ready to be used again. Thus, it may be desirable to construct one or more portions of safety system 18 in a cartridge that can be easily replaced. For example, in the exemplary implementation depicted in FIG. 2, safety system 18 includes a replaceable cartridge 80 having a housing 82. Pawl 60, spring 66, fusible member 70 and contact mount 72 are all mounted within housing 82. Alternatively, other portions of safety system 18 may be mounted within the housing. In any event, after the reaction system has been activated, the safety system can be reset by replacing cartridge 80. The portions of safety system 18 not mounted within the cartridge may be replaced separately or reused as appropriate. Various exemplary embodiments and implementations of a safety system using a replaceable cartridge are described in more detail in U.S. Provisional Patent Application Ser. No. 60/225,201, entitled "Replaceable Brake Mechanism For Power Equipment," filed Aug. 14, 2000 by SD3, LLC, and U.S. Provisional Patent Application Ser. No. 60/225,212, entitled "Brake Positioning System," filed Aug. 14, 2000 by SD3, LLC, the disclosures of which are herein incorporated by reference.

While one particular implementation of safety system 18 has been described, it will be appreciated that many variations and modifications are possible within the scope of the invention. Many such variations and modifications are described in U.S. Provisional Patent Application Ser. Nos. 60/182,866 and 60/157,340, the disclosures of which are herein incorporated by reference.

As briefly mentioned above, reaction subsystem 24 can be configured with a retraction system to retract or move a cutting tool away from the point of accidental contact with a user. Moving away from the point of accidental contact reduces the time the cutting tool is in contact with the user, thereby minimizing any injury to the user. Moving the cutting tool away from the point of accidental contact also prevents the cutting tool from moving toward the user, which could increase any injury to the user. For example, a spinning blade in a miter saw has substantial angular momentum, and that angular momentum could cause the blade to move downward toward a user when a brake pawl hits the blade. The spinning blade in a table saw also has substantial angular momentum that could cause the blade to move upward toward a user when a brake pawl hits the blade, depending on the position of the brake, the weight of the blade and the amount of play in the structure supporting the blade. Preventing any such movement lessens the potential injury to the user. A retraction system may be used in addition to or instead of other safety mechanisms.

Figure 3:
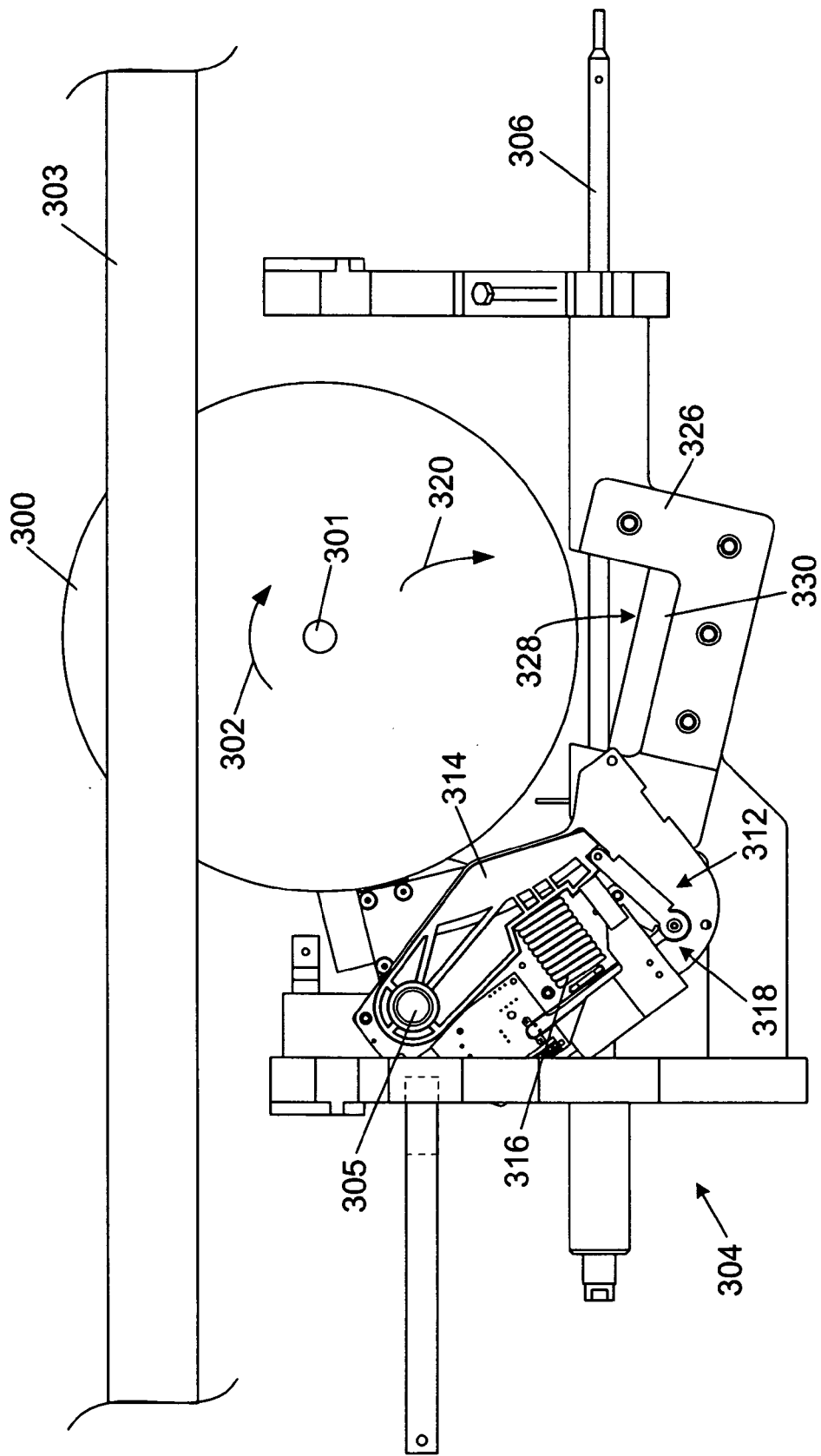
FIG. 3 is a schematic side view of a table saw with a retraction system.
Figure 4:
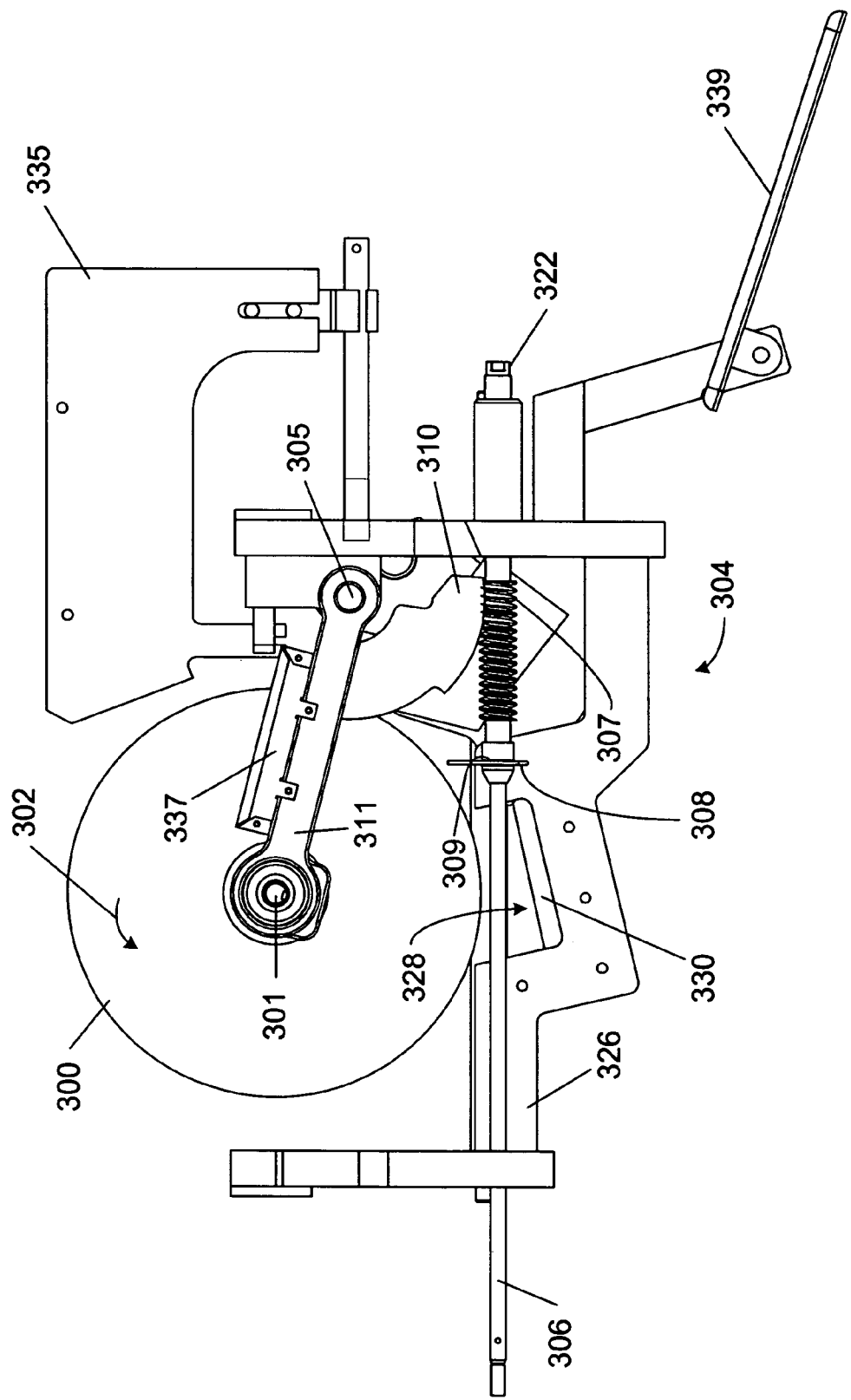
FIG. 4 is a schematic side view of a second side of a table saw with a retraction system.

FIGS. 3 and 4 show side views of a table saw configured with both a retraction system and a braking mechanism. A blade 300 is mounted on an arbor 301 to spin in the direction of arrow 302. A table 303 (not shown in FIG. 4), which defines the work surface or cutting region for the table saw, is adjacent the blade and the blade extends above the table. A support structure 304 may support blade 300 and arbor 301 in any known way, or as described in more detail in U.S. Provisional Patent Application Ser. No. 60/225,058, titled "Table Saw with Improved Safety System," filed Aug. 14, 2000.

Blade 300 is configured to pivot up and down so that a user can position the blade to extend above the table as needed. The blade pivots around a pin 305. A user may pivot the blade to adjust its position by turning a shaft 306 on which a worm gear 307 is mounted. The worm gear is mounted on the shaft so that it turns with the shaft, but so that it may slide on the shaft when necessary, as explained below. Worm gear 307 is mounted on shaft 306 like a collar, with the shaft extending through a longitudinal hole in the worm gear. The worm gear is held in place during normal operation of the saw by a spring clip 308, which is positioned in a groove or channel 309 on the worm gear and which also engages a detent or shoulder on shaft 306 to hold the worm gear in place. The worm gear engages an arcuate rack 310 that supports an arbor block 311, which in turn supports arbor 301 and blade 300. Thus, when a user turns shaft 306, such as by turning a knob attached to the shaft (not shown), worm gear 307 moves arbor block 311 and the blade up or down, depending on the direction that the worm gear is turned.

A brake cartridge 312 is mounted in the saw adjacent blade 300. The brake cartridge includes a pawl 314 biased toward blade 300 by a spring 316. The pawl is held away from blade 300 by a release mechanism 318, as described generally above and as described in more detail in U.S. Provisional Patent Application Ser. No. 60/225,170, entitled "Spring-Biased Brake Mechanism for Power Equipment," U.S. Provisional Patent Application Ser. No. 60/225,169, entitled "Brake Mechanism for Power Equipment," U.S. Provisional Patent Application Ser. No. 60/225,201, entitled "Replaceable Brake Mechanism for Power Equipment," and U.S. Provisional Patent Application Ser. No. 60/225,212, entitled "Brake Positioning System," all filed Aug. 14, 2000. The cartridge is configured so that the release mechanism releases the pawl into the blade upon the receipt of a detection signal, as explained generally above and as explained in more detail in U.S. Provisional Patent Application Ser. No. 60/225,056, titled "Firing Subsystem for use in a Fast-Acting Safety System," filed Aug. 14, 2000.

Brake cartridge 312 is positioned on the blade's pivot axis so that pawl 314 can move around pin 305. Thus, when pawl 314 hits the blade, the angular momentum of the blade is transferred to the arbor block, and the blade, arbor block, rack and cartridge try to retract or move down in the direction of arrow 320. Alternatively, the cartridge may be positioned on a pin different from pin 305, but that still pivots with the blade.

The blade will move down to the extent permitted by the contact between rack 310 and worm gear 307. If the worm gear is fixed in place, the downward movement of the blade may strip teeth on the rack and/or worm gear, and may prevent the blade from moving down as far as desired. In the embodiment shown in FIGS. 3 and 4, the worm gear is adapted to snap free and move on shaft 306 when the pawl hits the blade.

When the pawl hits the blade, the resultant angular momentum impulse causes spring clip 308 to snap loose, allowing the worm gear to slide down the shaft toward an end 322 of the shaft. The spring clip snaps loose because the rack moves down when the blade is stopped, and the rack contacts the worm gear and forces the worm gear to move. The force of the rack against the worm gear causes the spring clip to snap loose. The worm gear is put back in place by moving it back along shaft 306 until the spring clip snaps into place on the shaft.

The table saw shown in FIGS. 3 and 4 also includes a support 326 configured with a seat or region 328 in which is placed an impact-absorbing material 330. The support is positioned under the arbor and arbor block so that when the blade retracts, the arbor block strikes impact-absorbing material 330. Support 326 and impact absorbing material 330 act as a barrier to stop the downward movement of the blade. The support is positioned so that blade 300 may retract a sufficient distance. The impact-absorbing material can be any one of a number of cushioning materials, such as rubber, dense foam, plastic, etc. One material found to be suitable is available under the part number C-1002-06 from AearoEAR, of Indianapolis, Ind. Alternatively, impact-absorbing material 330 may be attached to the undersurface of the arbor block instead of on support 326. Additionally, support 326 may take many forms. In fact, shaft 306 may be configured and positioned so that it provides a surface to stop the downward movement of the blade.

FIG. 4 also shows a splitter 335 that extends above table 303 behind blade 300 to prevent kickback. A blade guard may also substantially enclose blade 300. FIG. 4 further shows a housing 337 for electronic components relating to the safety system, and a motor mount 339, which are not shown in FIG. 3.

In the construction described above, the angular momentum of the blade causes the blade, arbor block and cartridge to all pivot down away from the cutting region when the pawl strikes the blade. Thus, the angular momentum of the blade causes the retraction. Blade 300 is permitted to move downward a sufficient distance so that the blade is completely retracted. In independent experiments, the safety system depicted in FIGS. 3 and 4 and described above has been shown to retract the blade completely below table 303 within approximately 14 milliseconds after contact is detected. Indeed the downward motion of the blade during retraction is too fast to detect with the human eye, i.e., the blade disappears below table 303 with no discernable transition or downward motion. The ability of the blade to retract minimizes any injury from accidental contact with the blade.

Figure 5:
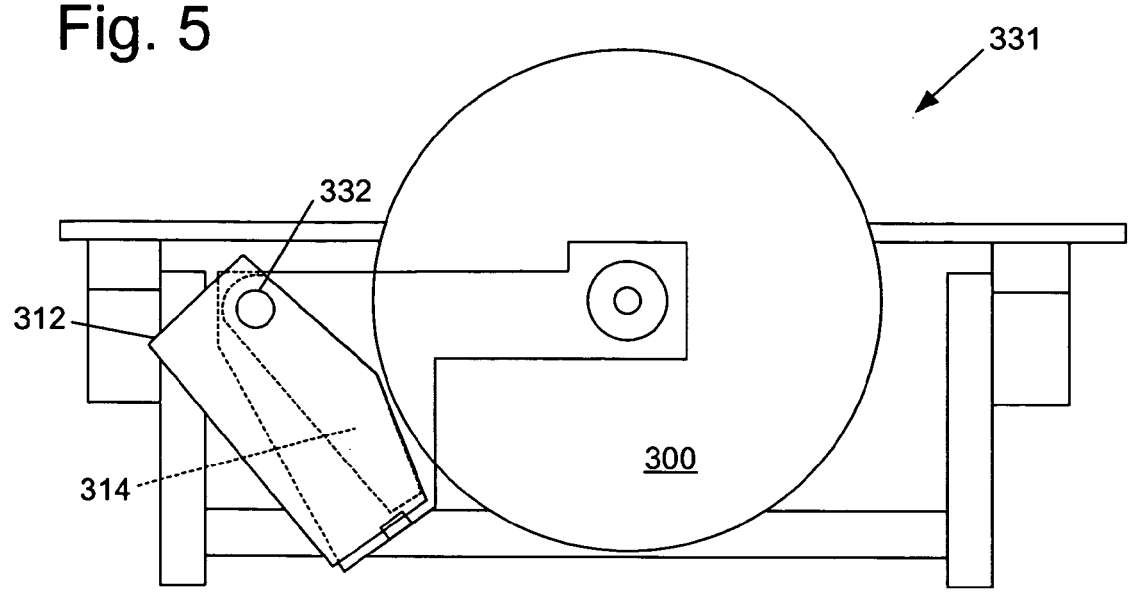
FIG. 5 is a schematic, side view of a saw with another embodiment of a retraction system.

FIG. 5 shows another embodiment of a retraction system used with a brake pawl. A saw 331 includes a blade 300 and a brake cartridge 312 housing a brake pawl 314. The cartridge and pawl are mounted to the frame of the saw by a pin 332. The pin is mounted to the saw in such a way that it may not pivot up and down with the blade. When the blade hits the pawl, the blade climbs down the pawl, or in other words, moves generally around the point of contact with the pawl. The pawl and blade do not pivot downward together, as in the embodiment shown in FIGS. 3 and 4, because the pawl is fixed to the frame of the saw. In this embodiment, the blade retracts by "climbing" down the pawl.

Figure 6:
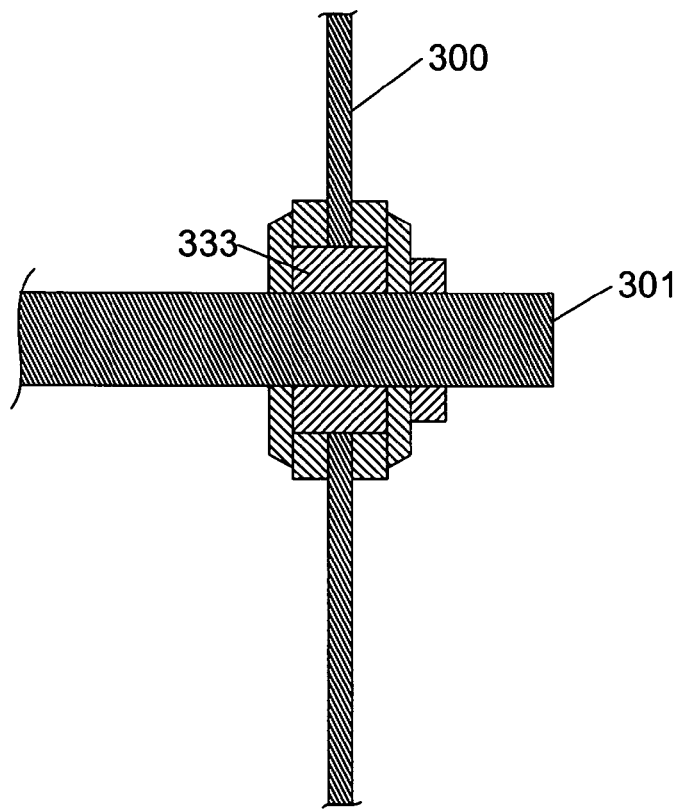
FIG. 6 is a section view of a retraction system using a deformable bushing.

Another embodiment of a retraction system comprises a compressible bushing. Typically, a blade 300 in a table saw, miter saw or other machine is mounted to an arbor over a bushing 333, as shown in FIG. 6. A locking nut, washers and an arbor flange are used to secure the blade to the arbor. Bushing 333 may be constructed from a material that is soft enough to deform when the blade is stopped suddenly. For example, depending on the type of braking system used, a substantial radial impact load may be transmitted to the arbor when the brake is actuated. A deformable bushing can be used to absorb some of this impact and reduce the chance of damage to the arbor. In addition, proper positioning of the brake in combination with a deformable bushing may be employed to cause the blade to move away from the user upon activation of the brake. Where a plastic bushing is placed between the blade and the arbor, the substantial force created by stopping the blade almost instantly may cause the bushing to deform. Typically, the edge of the mounting hole of the blade will bite into the bushing as the blade attempts to rotate about the pawl. Therefore, if the pawl is mounted at the back of the blade, then the blade will tend to move downward into the bushing and away from the user when the pawl engages the blade.

Figure 7:
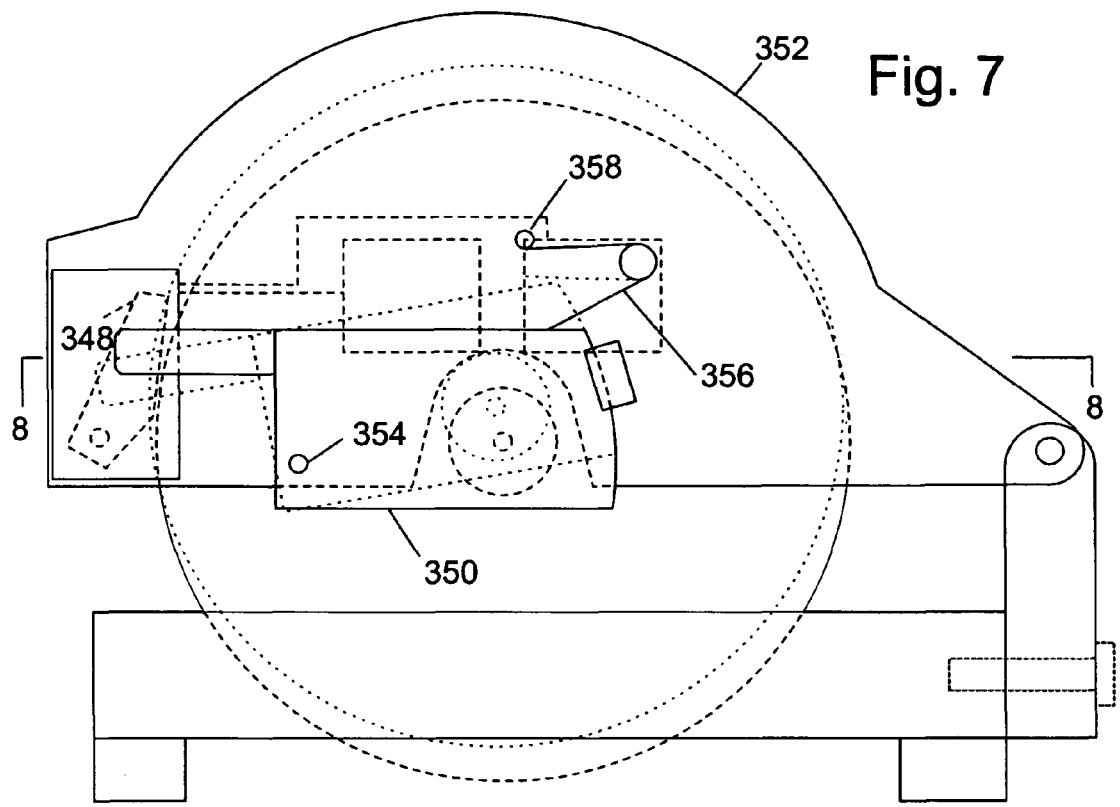
FIG. 7 is a schematic side view of a miter saw with a retraction system.
Figure 8:
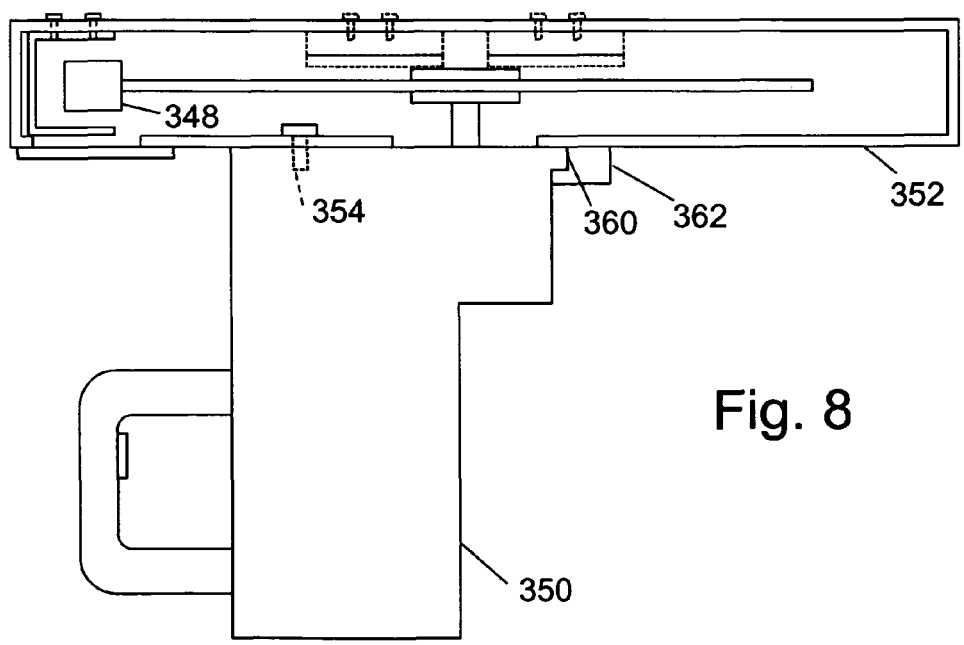
FIG. 8 is a section view of the miter saw shown in FIG. 7.

FIGS. 7 and 8 show a miter saw equipped with both a brake and a retraction system. The miter saw is configured with a pivotal motor assembly to allow the blade to move upward into the housing upon engagement with a brake pawl 348. Motor assembly 350 is connected to housing 352 via pivot bolt 354, allowing the motor assembly to pivot about bolt 354 in the direction of blade rotation. A spring 356 is compressed between the motor assembly and an anchor 358 to bias the motor assembly against the direction of blade rotation. The motor assembly may include a lip 360, which slides against a flange 362 on the housing to hold the end of the motor assembly opposite the pivot bolt against the housing.

When the saw is in use, spring 356 holds the motor assembly in a normal position rotated fully counter to the direction of blade rotation. However, once the pawl is released to engage the blade, the motor assembly and blade pivot upward against the bias of the spring. In this embodiment, the pawl is positioned at the front of the blade so that the pivot bolt 354 is between the pawl and the arbor. This arrangement encourages the blade to move upward into the housing when stopped. The spring is selected to be sufficiently strong to hold the motor assembly down when cutting through a workpiece, but sufficiently compressible to allow the blade and motor assembly to move upward when the blade is stopped. Of course, the blade and motor assembly may be configured in any of a variety of ways to at least partially absorb the angular momentum of the blade.

Figure 9:
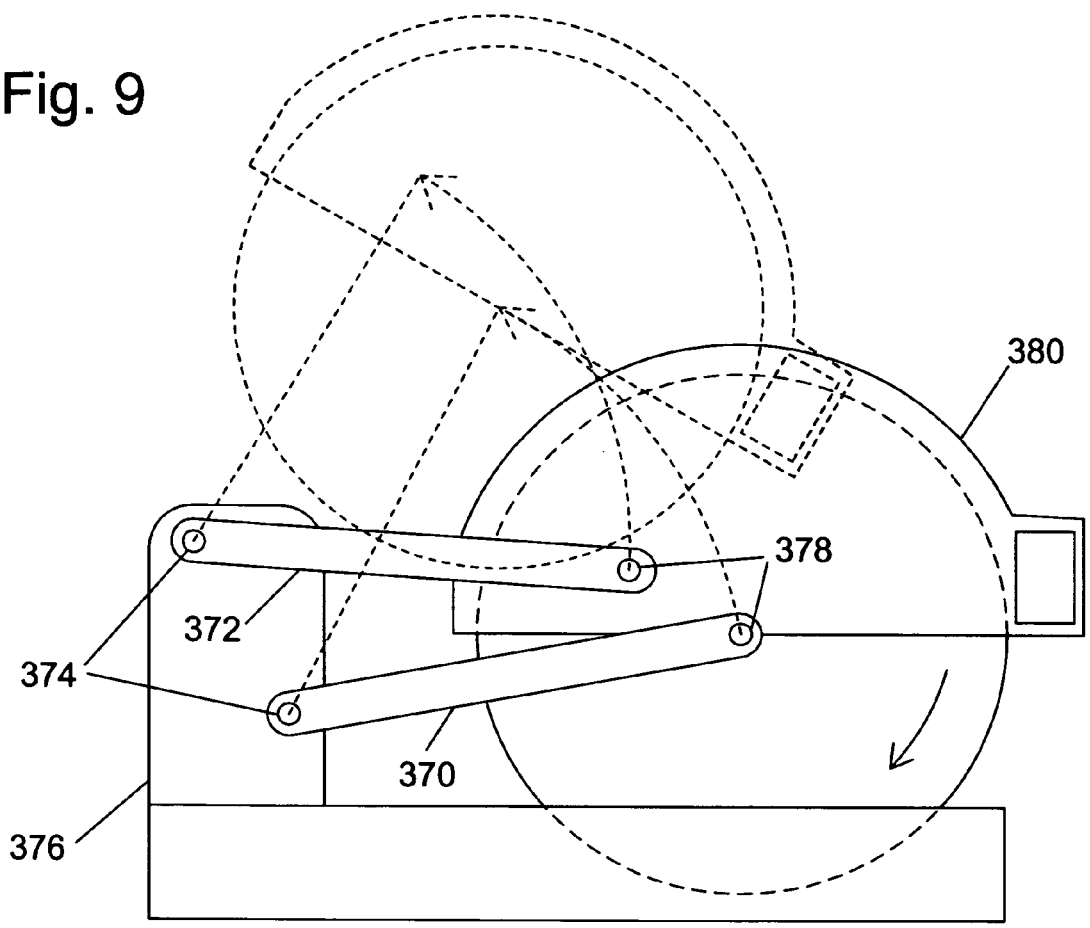
FIG. 9 shows another embodiment of a miter saw with a retraction system.

FIG. 9 shows an alternative configuration of a miter saw adapted to move away from an accidental contact with a user by absorbing the angular momentum of the blade. In this configuration, the miter saw includes two swing arms 370 and 372. One end 374 of each swing arm 370, 372 is connected to base 376, and the opposite end 378 of each swing arm is connected to housing 380, the blade, and/or the motor assembly (not shown). The position of the swing arms relative to each other may vary depending on the swing arm motion desired. In FIG. 9, swing arm 370 is connected to base 376 somewhat below and forward of swing arm 372. Typically, the motor assembly is rigidly attached to end 378 of swing arm 370, while housing 380 is connected to rotate about end 378 of swing arm 370. End 378 of swing arm 372 is connected only to the housing. Alternatively, the motor assembly may be connected to rotate about end 378 of swing arm 370 along with the housing.

The geometry of the configuration shown in FIG. 9 causes the housing and/or motor assembly to rotate as the swing arms pivot. Significantly, when the swing arms move upward, the housing and/or motor assembly rotate in the same direction in which the blade rotates during cutting. As a result, when a brake pawl engages the blade and transfers the angular momentum of the blade to the housing and/or motor assembly, the housing and/or motor assembly tend to rotate in the same direction as the blade. This causes the swing arms to pivot upward, drawing the blade away from the workpiece and the user's body. Thus, the miter saw configuration illustrated in FIG. 9 is adapted to absorb the angular momentum of the blade and translate that angular momentum into an upward force on the swing arms.

Figure 10:
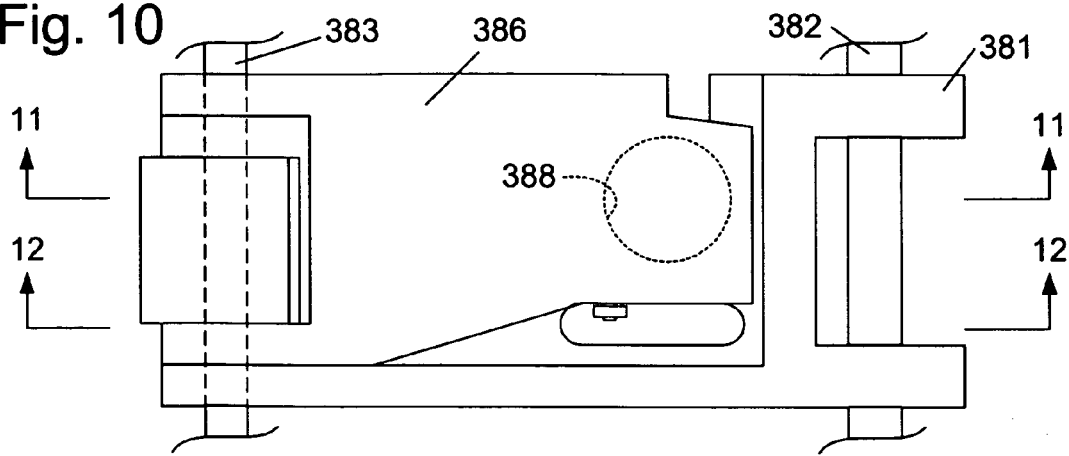
FIG. 10 shows a schematic drawing of a retraction system using a spring to retract a cutting tool.
Figure 11:
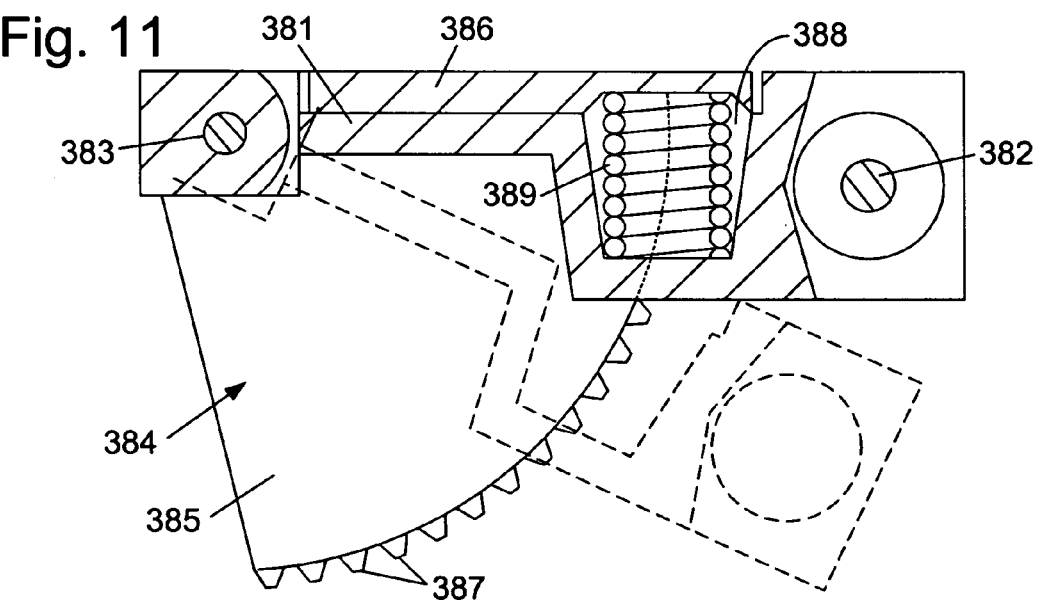
FIG. 11 is a sectional view of the retraction system shown in FIG. 10.
Figure 12:
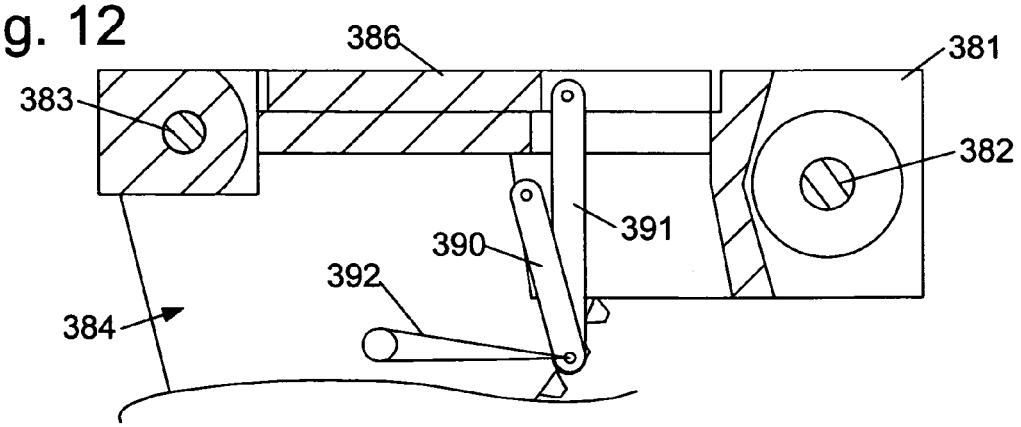
FIG. 12 also is a sectional view of the retraction system shown in FIG. 10.

In any of the systems described above, a spring or other force can be used to push the blade away from the point of contact with the user. The spring could be released by a mechanism similar to the mechanism that releases the pawl to strike the blade. FIGS. 10-12 show how a spring may be used to retract a blade in a table saw. FIG. 10 is a top view and FIGS. 11 and 12 are side views of an arbor block 381 holding an arbor 382 used to drive a blade (not shown). Arbor block 381 is pivotally mounted to pin 383 so that the arbor block and blade may pivot up and down to adjust the position of the blade in the saw.

A segment gear 384, like rack 310 described above in connection with FIGS. 3 and 4, is also mounted on pin 383, and is connected to arbor block 381 in the manner described below, to raise and lower the arbor. Segment gear 384 includes a side portion 385 positioned substantially perpendicularly to the plane of arbor block 381, and a top portion 386 positioned over arbor block 381. The side portion 385 includes gear teeth 387 to engage a worm gear to raise and lower the arbor block. Side portion 385 and top portion 386 are connected to each other and move together. Top portion 386 extends over the top of the entire arbor block, as shown. The arbor block is constructed with a region to accommodate top portion 386 so that top portion 386 does not extend substantially above the arbor block, which could limit the ability of the arbor block and blade to pivot upward when desired, such as by contacting the underside of a table in a table saw.

A pocket 388 is formed in arbor block 381 to house a spring 389. In the position shown in FIG. 11, spring 389 is compressed between top portion 386 of segment gear 384 and arbor block 381 because the segment gear and arbor block are coupled together.

The segment gear and arbor block are coupled by a compound linkage having, as shown in FIG. 12, a first arm 390 attached at one end to the arbor block and at its other end to a second arm 391. The second arm, in turn, is attached to top portion 386 of segment gear 384, as shown. First and second arms 390 and 391 are hingedly connected to each other, and to the arbor block and segment gear. The arms are configured so that the force of the spring pushing apart the arbor block and the top portion of the segment gear biases the first and second arms in such a way that the arms want to move. A fusible member 392, which may take the form of a wire as described above, restrains the arms from movement. Of course, numerous different linkages may be used, and numerous types and configurations of fusible members or other release mechanisms may be used. The linkage may be selected to provide a sufficient mechanical advantage so that the arbor block and top portion of the segment gear may be held together with as thin a fusible member as possible, so that the fusible member may be burned as easily as possible. Various analogous compound linkages are described in U.S. Provisional Patent Application Ser. No. 60/225,170, entitled "Spring-Biased Brake Mechanism for Power Equipment," filed Aug. 14, 2000. The fusible member may be burned by a system as described above, or as described in more detail in U.S. Provisional Patent Application Ser. No. 60/225,056, entitled "Firing Subsystem for Use in Fast-Acting Safety System," filed Aug. 14, 2000. The compound linkage and the fusible member are preferably configured so that they accommodate spring forces of 100 to 500 pounds or more.

When the fusible member is burned, the compound linkage is free to move, and the spring pushes arbor block 381 down, away from top portion 386 of the segment gear, as shown by the dashed lines in FIG. 11, thereby retracting the blade. The stronger the spring, the faster the blade will be retracted. The segment gear does not move because it is coupled through teeth 387 to a worm gear or some other structure.

Retracting a blade by a spring or some other force may be thought of as direct retraction. A spring or other force may be used with some other retraction system to increase the speed that a cutting tool retracts, or a spring or other force may be used as the sole means of retraction. The systems for direct retraction described above may be used on various pieces of equipment, including table saws, miter saws and band saws.

Figure 13:
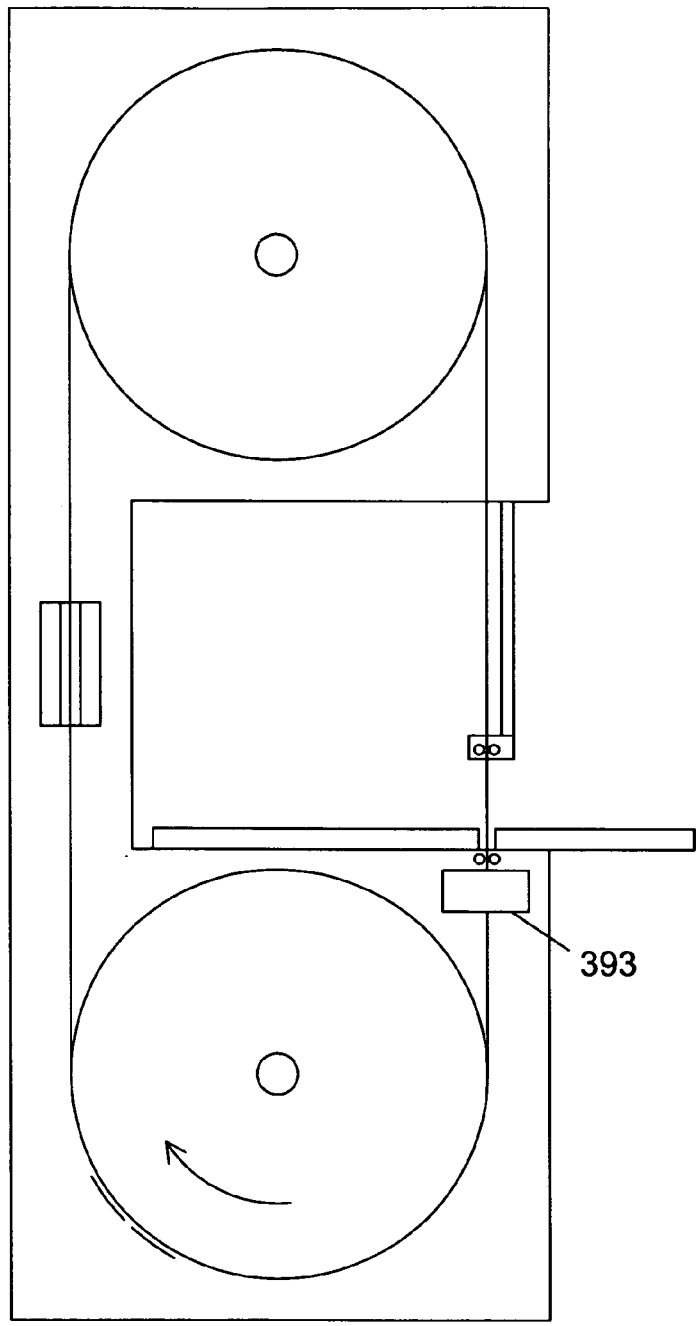
FIG. 13 is a schematic view of a band saw with a retraction system.

FIG. 13 is a schematic diagram of a system to retract the blade of a band saw. Typically, a band saw includes a main housing enclosing a pair of vertically spaced-apart wheels. The perimeter of each wheel is coated or covered in a high-friction material such as rubber, etc. A relatively thin, continuous loop blade tightly encircles both wheels. A workpiece is cut by passing it toward the blade in a cutting zone between the wheels. The workpiece is passed toward the blade on a table, which forms the bottom of the cutting zone.

Figure 14:
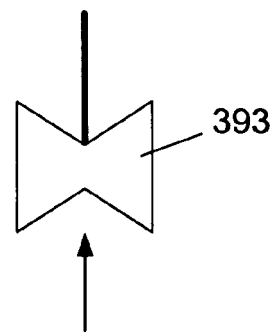
FIG. 14 is a top view of a roller used in the system shown in FIG. 13.

The band saw shown in FIG. 13 includes roller 393 positioned adjacent the blade. The roller is configured to contact the blade and push the blade away from the point of accidental contact with a user. In addition, the roller may be configured to push the blade off the wheels, thereby stopping the motion of the blade. A top view of the roller is shown in FIG. 14 pushing against a blade in the direction of the arrow. The roller may be part of a cartridge, and may be released into the blade just as the pawls described above are released. The roller should have a diameter large enough so that the roller can roll over the teeth of the blade.

The systems for direct retraction of a cutting tool may also be implemented on hand-held circular saws. Such saws typically include a base plate that contacts a workpiece during sawing. The base plate supports the saw on the workpiece. The base plate may be configured so that it is pushed down when the blade contacts a user. The result of that action is to effectively retract the blade because the base plate would push the user away from the blade.

INDUSTRIAL APPLICABILITY

The present invention is applicable to power equipment, and specifically to woodworking equipment such as table saws, miter saws, band saws, circular saws, jointers, etc. The present invention provides a safety system wherein a cutting tool or other dangerous item is retracted upon the occurrence of a specified event, such as when accidental contact between a user and a blade is detected. Retraction of a cutting tool, for example, can minimize any injury from accidental contact with the cutting tool by reducing the amount of time the cutting tool is in contact with a user or by moving the cutting tool to a position where the user cannot contact it. A retraction system may be used in combination with other safety features to maximize the performance of an overall safety system. For example, a retraction system may be used with a system that quickly stops a cutting tool so that the cutting tool simultaneously stops and moves away from a user.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

The invention claimed is:

1. A method for minimizing potential injuries from a woodworking machine having a movable cutting tool, the method comprising:
    detecting accidental contact between a person and the cutting tool; and
    retracting the cutting tool away from the person in the event accidental contact between the person and the cutting tool is detected;
    where the cutting tool rotates and has angular momentum, and where the step of retracting includes using at least a portion of the angular momentum of the cutting tool to retract the cutting tool away from the person.

* * * * *